(12) United States Patent
Jhang et al.

(10) Patent No.: US 12,038,562 B2
(45) Date of Patent: Jul. 16, 2024

(54) OPTICAL IMAGING LENS

(71) Applicant: GENIUS ELECTRONIC OPTICAL (XIAMEN) CO., LTD., Fujian (CN)

(72) Inventors: Jia-Sin Jhang, Fujian (CN); Yongfeng Lai, Fujian (CN); Baina Chen, Fujian (CN)

(73) Assignee: GENIUS ELECTRONIC OPTICAL (XIAMEN) CO., LTD., Xiamen (CN)

( * ) Notice: Subject to any disclaimer, the term of this patent is extended or adjusted under 35 U.S.C. 154(b) by 524 days.

(21) Appl. No.: 17/238,220

(22) Filed: Apr. 23, 2021

(65) Prior Publication Data
US 2022/0308315 A1    Sep. 29, 2022

(30) Foreign Application Priority Data
Mar. 24, 2021    (CN) .......................... 202110316182.3

(51) Int. Cl.
   G02B 13/00    (2006.01)
   G02B 9/64    (2006.01)
(52) U.S. Cl.
   CPC .......... *G02B 13/0045* (2013.01); *G02B 9/64* (2013.01)
(58) Field of Classification Search
   CPC .................................................. G02B 13/0045
   See application file for complete search history.

(56) References Cited

U.S. PATENT DOCUMENTS

| | | | |
|---|---|---|---|
| 2016/0223790 A1 | 8/2016 | Liao et al. | |
| 2019/0041611 A1 | 2/2019 | Chang et al. | |
| 2021/0048625 A1* | 2/2021 | Yang | G02B 9/64 |

FOREIGN PATENT DOCUMENTS

| | | |
|---|---|---|
| CN | 110824670 | 2/2020 |
| CN | 111007641 | 4/2020 |
| CN | 111077652 | 4/2020 |
| CN | 111929830 | 11/2020 |
| CN | 112014948 | 12/2020 |
| JP | 2006301393 | 11/2006 |
| JP | 2011059640 | 3/2011 |
| JP | 2016062019 | 4/2016 |

(Continued)

OTHER PUBLICATIONS

"Office Action of Taiwan Counterpart Application", dated Jan. 27, 2022, p. 1-p. 12.

(Continued)

*Primary Examiner* — Robert E. Tallman
(74) *Attorney, Agent, or Firm* — JCIPRNET

(57) ABSTRACT

An optical imaging lens, including a first lens element, a second lens element, a third lens element, a fourth lens element, a fifth lens element, a sixth lens element, and a seventh lens element arranged in sequence from an object side to an image side along an optical axis, is provided. Each of the first lens element to the seventh lens element includes an object-side surface and an image-side surface. An optical axis region of the image-side surface of the first lens element is concave. A periphery region of the object-side surface of the second lens element is concave and an optical axis region of the image-side surface of the second lens element is convex. The seventh lens element has negative refracting power and an optical axis region of the image-side surface of the seventh lens element is concave.

20 Claims, 22 Drawing Sheets

(56) References Cited

FOREIGN PATENT DOCUMENTS

| | | |
|---|---|---|
| JP | 2019045631 | 3/2019 |
| JP | 2019078839 | 5/2019 |
| JP | 2019078994 | 5/2019 |
| JP | 2019132967 | 8/2019 |
| TW | I665488 | 7/2019 |
| TW | I667509 | 8/2019 |
| TW | M597875 | 7/2020 |
| TW | I721904 | 3/2021 |
| TW | I749970 | 12/2021 |
| WO | 2014192567 | 12/2014 |

OTHER PUBLICATIONS

"Office Action of China Counterpart Application", issued on Jul. 21, 2023, p. 1-p. 7.

* cited by examiner

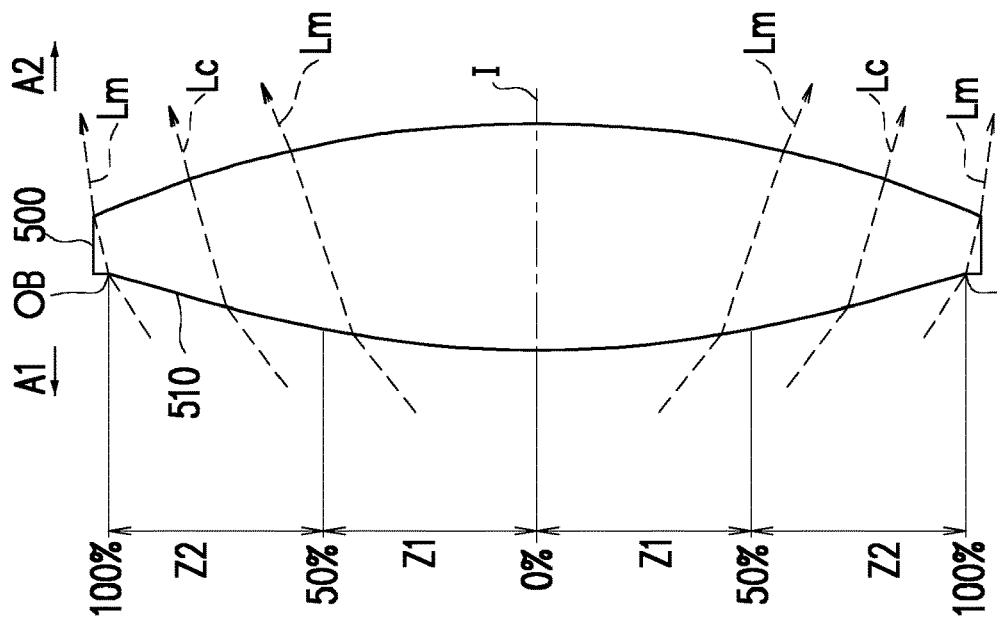
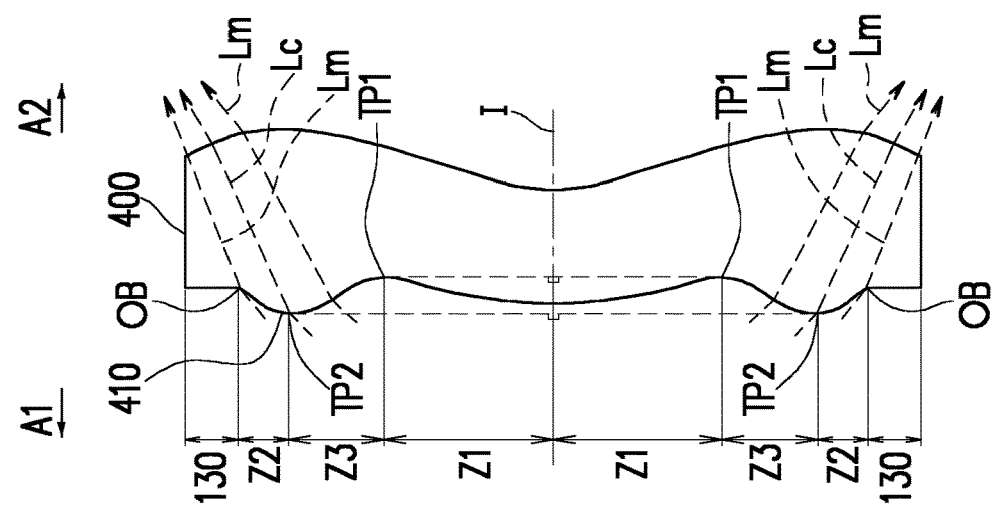
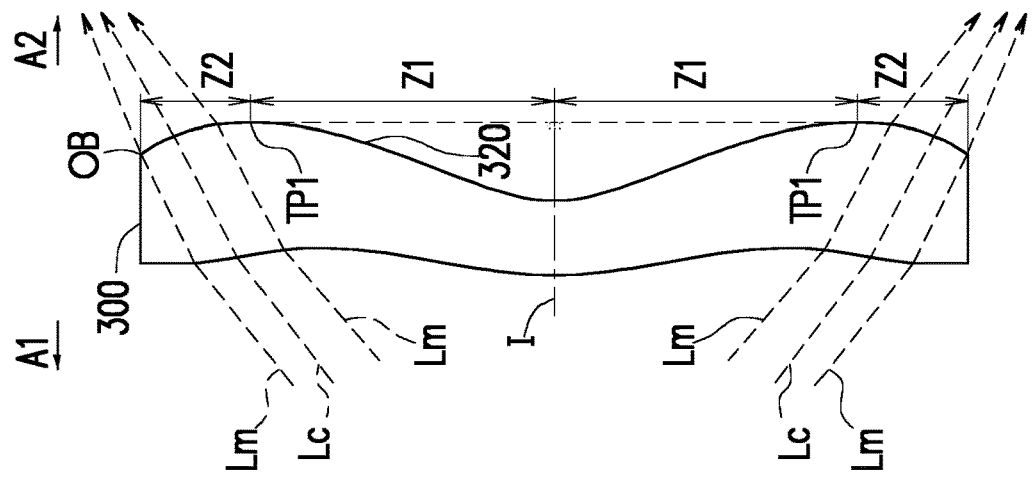

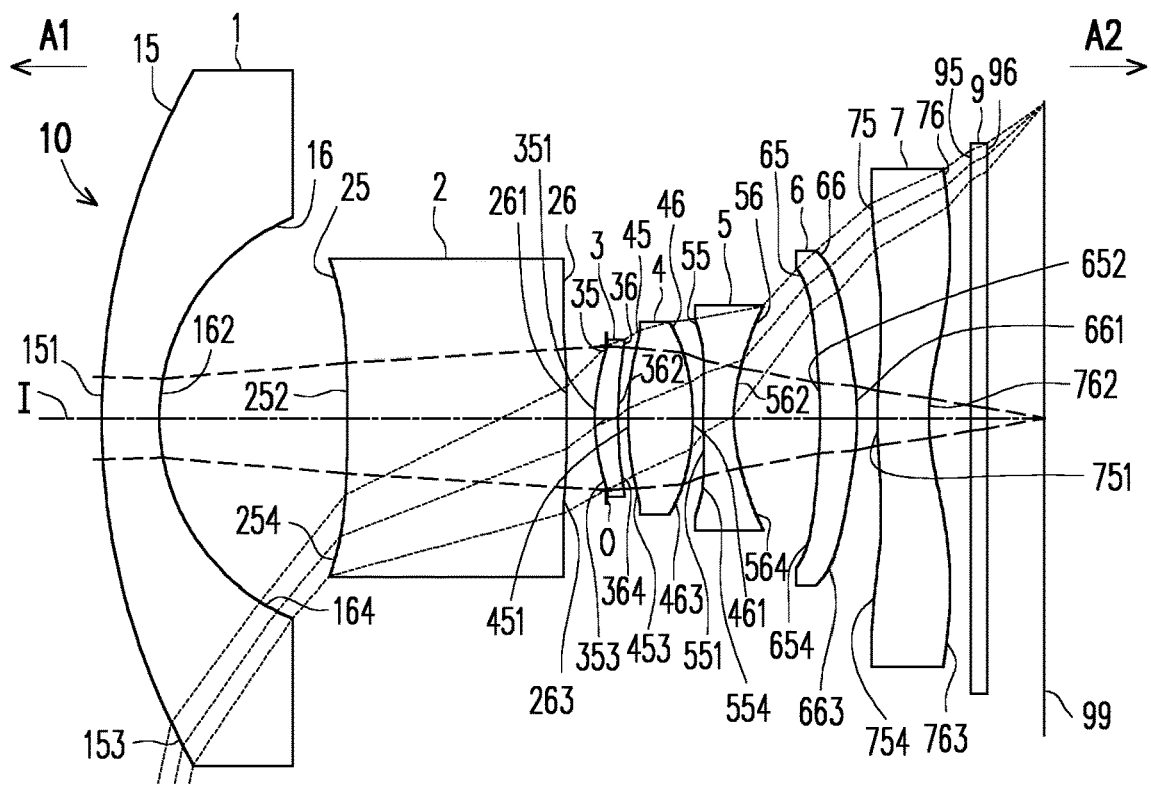
FIG. 6
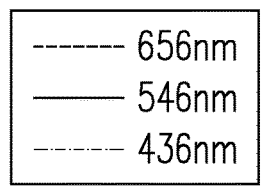
FIG. 7A  FIG. 7B  FIG. 7C FIG. 7D
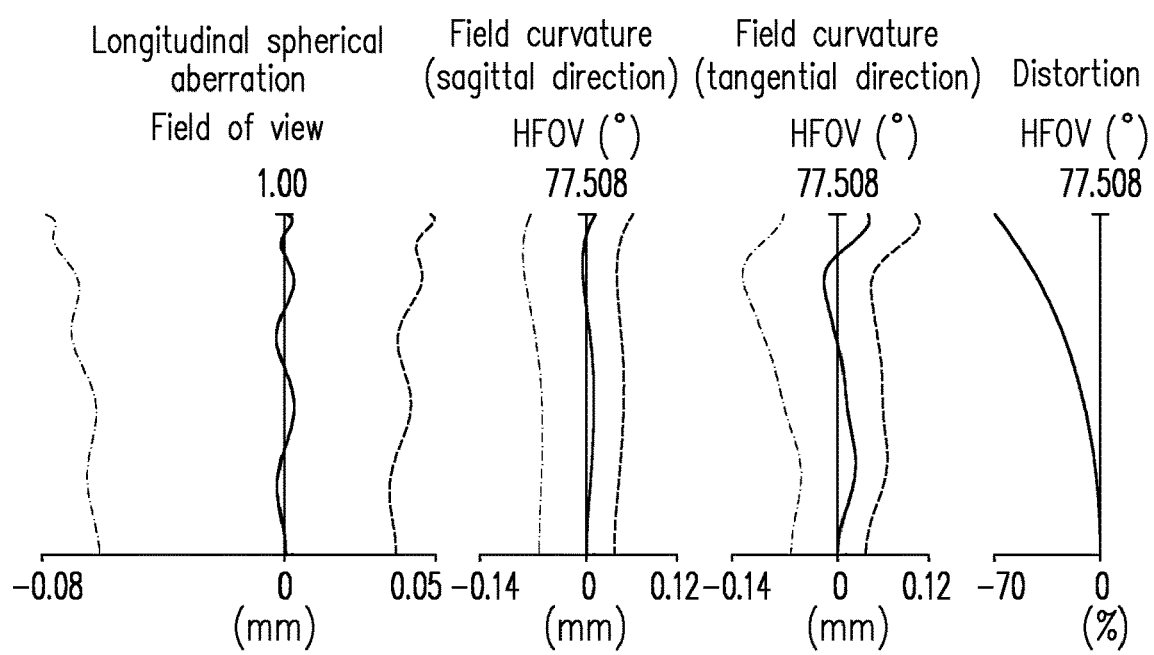

| First Embodiment |||||||
|---|---|---|---|---|---|---|
| EFL = 2.921 mm, HFOV = 77.508°, TTL = 11.969 mm, Fno = 2.744, ImgH = 4.000 mm |||||||
| Element | Surface | Radius of curvature (mm) | Spacing (mm) | Refractive index | Abbe number | Focal length (mm) |
| Object | | Infinity | Infinity | | | |
| First lens element 1 | Object-side surface 15 | 8.898 | 0.733 | 1.665 | 54.658 | -6.299 |
| | Image-side surface 16 | 2.761 | 2.379 | | | |
| Second lens element 2 | Object-side surface 25 | -48.036 | 2.785 | 1.640 | 23.529 | 178.035 |
| | Image-side surface 26 | -34.647 | 0.504 | | | |
| Aperture 0 | | Infinity | -0.143 | | | |
| Third lens element 3 | Object-side surface 35 | 2.649 | 0.293 | 1.567 | 37.533 | 7.181 |
| | Image-side surface 36 | 7.200 | 0.128 | | | |
| Fourth lens element 4 | Object-side surface 45 | 4.336 | 0.824 | 1.584 | 59.458 | 3.000 |
| | Image-side surface 46 | -2.752 | 0.134 | | | |
| Fifth lens element 5 | Object-side surface 55 | 14.521 | 0.388 | 1.582 | 30.186 | -4.409 |
| | Image-side surface 56 | 2.175 | 1.096 | | | |
| Sixth lens element 6 | Object-side surface 65 | -5.947 | 0.463 | 1.535 | 56.072 | 11.908 |
| | Image-side surface 66 | -3.165 | 0.261 | | | |
| Seventh lens element 7 | Object-side surface 75 | 7.879 | 0.653 | 1.640 | 23.529 | -6.612 |
| | Image-side surface 76 | 2.678 | 0.530 | | | |
| Filter 9 | Object-side surface 95 | Infinity | 0.210 | 1.517 | 64.167 | |
| | Image-side surface 96 | Infinity | 0.730 | | | |
| | Image plane 99 | Infinity | | | | |

FIG. 8

| Surface | K | $a_2$ | $a_4$ | $a_6$ | $a_8$ |
|---|---|---|---|---|---|
| 25 | 0.000000E+00 | 0.000000E+00 | -1.316491E-02 | 1.217812E-03 | -1.259356E-03 |
| 26 | 0.000000E+00 | 0.000000E+00 | -2.753203E-02 | 2.620459E-02 | -3.862628E-02 |
| 35 | 0.000000E+00 | 0.000000E+00 | 1.025833E-02 | -1.235019E-01 | 4.618119E-01 |
| 36 | 0.000000E+00 | 0.000000E+00 | 6.806872E-02 | -1.056493E-01 | 2.049730E-01 |
| 45 | 0.000000E+00 | 0.000000E+00 | 4.181789E-02 | -4.335318E-02 | 2.298483E-02 |
| 46 | 0.000000E+00 | 0.000000E+00 | 7.633473E-02 | -2.673485E-01 | 5.463870E-01 |
| 55 | 0.000000E+00 | 0.000000E+00 | -4.232630E-04 | -2.247958E-01 | 3.932029E-01 |
| 56 | 5.374356E-01 | 0.000000E+00 | -5.069810E-02 | -4.081442E-02 | 8.174770E-02 |
| 65 | 0.000000E+00 | 0.000000E+00 | 2.781445E-02 | 6.340276E-04 | -9.789608E-03 |
| 66 | 7.851272E-02 | 0.000000E+00 | 5.794100E-02 | -5.521568E-03 | -1.109734E-02 |
| 75 | 0.000000E+00 | 0.000000E+00 | -2.281131E-02 | -2.436750E-03 | 2.119913E-03 |
| 76 | -4.670867E-01 | 0.000000E+00 | -6.381229E-02 | 1.366697E-02 | -2.480009E-03 |
| Surface | $a_{10}$ | $a_{12}$ | $a_{14}$ | $a_{16}$ | |
| 25 | 8.527385E-04 | -3.029080E-04 | 5.582972E-05 | -4.102641E-06 | |
| 26 | 5.065799E-02 | -3.868452E-02 | 1.603179E-02 | -2.813336E-03 | |
| 35 | -1.063570E+00 | 1.390131E+00 | -9.555876E-01 | 2.645487E-01 | |
| 36 | -3.812867E-01 | 4.246761E-01 | -2.508372E-01 | 5.624975E-02 | |
| 45 | -1.105383E-02 | 0.000000E+00 | 0.000000E+00 | 0.000000E+00 | |
| 46 | -7.092606E-01 | 5.408272E-01 | -2.220114E-01 | 3.789331E-02 | |
| 55 | -4.367259E-01 | 2.890369E-01 | -1.004431E-01 | 1.423266E-02 | |
| 56 | -7.936500E-02 | 4.394066E-02 | -1.275188E-02 | 1.458920E-03 | |
| 65 | 3.601915E-03 | 3.843190E-05 | -2.535377E-04 | 3.520133E-05 | |
| 66 | 6.623050E-03 | -1.676194E-03 | 2.021961E-04 | -9.880270E-06 | |
| 75 | -4.221232E-04 | 4.206019E-05 | -2.152055E-06 | 4.386387E-08 | |
| 76 | 3.165561E-04 | -2.687355E-05 | 1.351575E-06 | -3.081909E-08 | |

FIG. 9

| Second Embodiment ||||||
|---|---|---|---|---|---|---|
| EFL = 2.864 mm, HFOV = 77.506°, TTL = 10.595 mm, Fno = 2.529, ImgH = 4.000 mm |||||||
| Element | Surface | Radius of curvature (mm) | Spacing (mm) | Refractive index | Abbe number | Focal length (mm) |
| Object | | Infinity | Infinity | | | |
| First lens element 1 | Object-side surface 15 | 15.269 | 1.364 | 1.665 | 54.658 | -4.614 |
| | Image-side surface 16 | 2.471 | 1.096 | | | |
| Second lens element 2 | Object-side surface 25 | -12.544 | 1.755 | 1.642 | 22.409 | -1580.324 |
| | Image-side surface 26 | -13.398 | 0.693 | | | |
| Aperture 0 | | Infinity | -0.149 | | | |
| Third lens element 3 | Object-side surface 35 | 2.844 | 0.376 | 1.535 | 56.072 | 5.703 |
| | Image-side surface 36 | 38.095 | 0.154 | | | |
| Fourth lens element 4 | Object-side surface 45 | 4.424 | 0.759 | 1.584 | 59.458 | 3.529 |
| | Image-side surface 46 | -3.642 | 0.098 | | | |
| Fifth lens element 5 | Object-side surface 55 | 5.644 | 0.367 | 1.671 | 19.243 | -5.448 |
| | Image-side surface 56 | 2.176 | 0.950 | | | |
| Sixth lens element 6 | Object-side surface 65 | -10.090 | 0.424 | 1.535 | 56.072 | 7.752 |
| | Image-side surface 66 | -2.990 | 0.336 | | | |
| Seventh lens element 7 | Object-side surface 75 | 6.939 | 0.827 | 1.642 | 22.409 | -7.124 |
| | Image-side surface 76 | 2.643 | 0.530 | | | |
| Filter 9 | Object-side surface 95 | Infinity | 0.210 | 1.517 | 64.167 | |
| | Image-side surface 96 | Infinity | 0.805 | | | |
| | Image plane 99 | Infinity | | | | |

FIG. 12

| Surface | K | $a_2$ | $a_4$ | $a_6$ | $a_8$ |
|---|---|---|---|---|---|
| 25 | 0.000000E+00 | 0.000000E+00 | -1.543995E-02 | 1.546135E-03 | -1.073812E-03 |
| 26 | 0.000000E+00 | 0.000000E+00 | -7.996504E-03 | 1.619823E-02 | -3.635028E-02 |
| 35 | 0.000000E+00 | 0.000000E+00 | 2.497235E-02 | -1.160176E-01 | 4.654280E-01 |
| 36 | 0.000000E+00 | 0.000000E+00 | 3.481096E-02 | -9.466812E-02 | 2.068395E-01 |
| 45 | 0.000000E+00 | 0.000000E+00 | 1.848732E-02 | -4.530521E-02 | 1.450423E-02 |
| 46 | 0.000000E+00 | 0.000000E+00 | 9.486644E-02 | -2.782710E-01 | 5.441409E-01 |
| 55 | 0.000000E+00 | 0.000000E+00 | 2.920005E-02 | -2.145583E-01 | 3.956976E-01 |
| 56 | 7.130834E-01 | 0.000000E+00 | -4.637588E-02 | -3.350394E-02 | 8.176982E-02 |
| 65 | 0.000000E+00 | 0.000000E+00 | 2.286845E-02 | 5.038312E-04 | -9.703299E-03 |
| 66 | -2.162182E-01 | 0.000000E+00 | 6.378373E-02 | -5.370307E-03 | -1.112295E-02 |
| 75 | 0.000000E+00 | 0.000000E+00 | -2.323189E-02 | -2.351301E-03 | 2.127699E-03 |
| 76 | -4.609065E-01 | 0.000000E+00 | -6.344567E-02 | 1.362926E-02 | -2.478492E-03 |
| Surface | $a_{10}$ | $a_{12}$ | $a_{14}$ | $a_{16}$ | |
| 25 | 8.178771E-04 | -2.983887E-04 | 5.240592E-05 | -3.626298E-06 | |
| 26 | 5.202561E-02 | -4.010642E-02 | 1.563903E-02 | -2.429851E-03 | |
| 35 | -1.070927E+00 | 1.389839E+00 | -9.539157E-01 | 2.675193E-01 | |
| 36 | -3.780776E-01 | 4.230074E-01 | -2.539745E-01 | 6.214650E-02 | |
| 45 | 3.485252E-04 | 0.000000E+00 | 0.000000E+00 | 0.000000E+00 | |
| 46 | -7.048880E-01 | 5.434015E-01 | -2.217995E-01 | 3.681402E-02 | |
| 55 | -4.372362E-01 | 2.873365E-01 | -1.012765E-01 | 1.439724E-02 | |
| 56 | -8.079332E-02 | 4.347839E-02 | -1.272938E-02 | 1.508196E-03 | |
| 65 | 3.595699E-03 | 3.535277E-05 | -2.512453E-04 | 3.635850E-05 | |
| 66 | 6.620190E-03 | -1.677581E-03 | 2.017379E-04 | -9.911108E-06 | |
| 75 | -4.215710E-04 | 4.206190E-05 | -2.164433E-06 | 4.058665E-08 | |
| 76 | 3.168395E-04 | -2.686396E-05 | 1.349979E-06 | -3.113245E-08 | |

FIG. 13

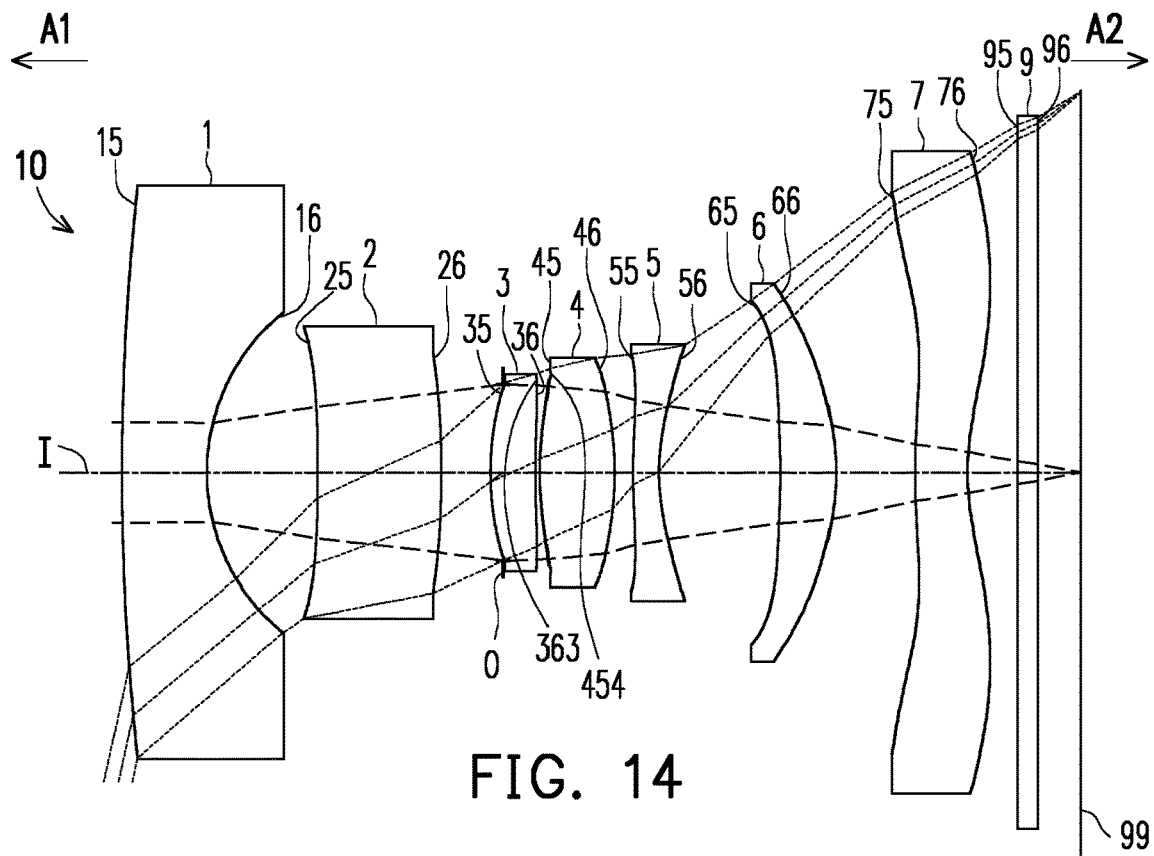
FIG. 14
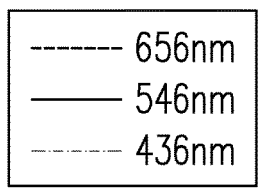
- - - - - 656nm
——— 546nm
— - — 436nm
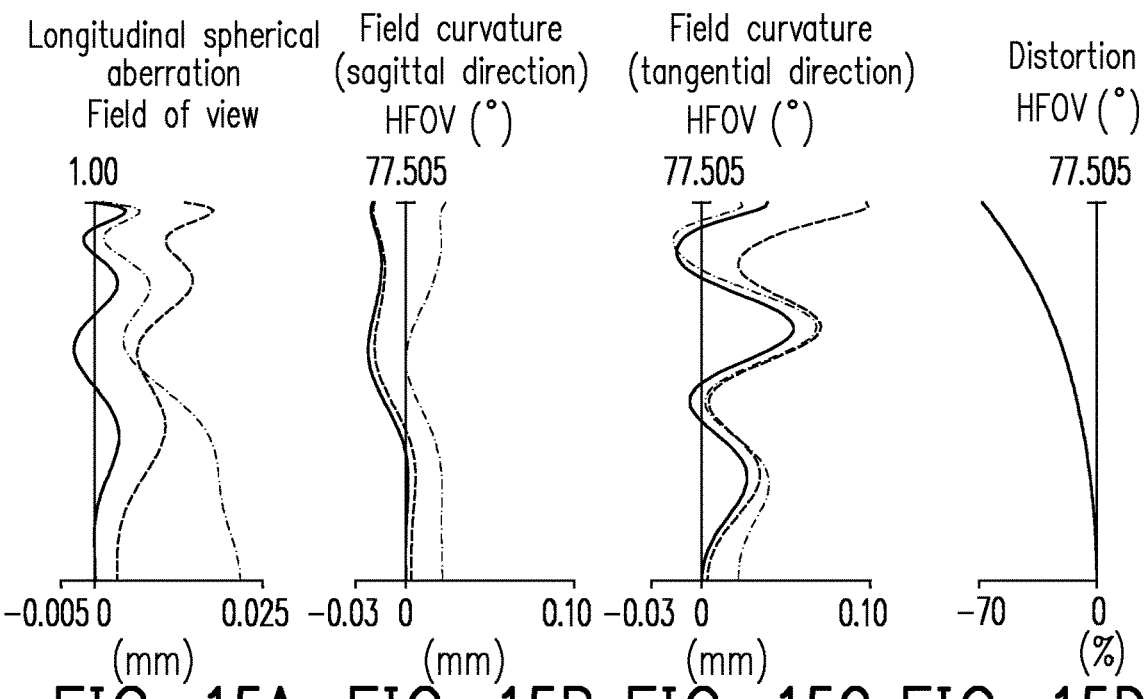
FIG. 15A   FIG. 15B   FIG. 15C   FIG. 15D

| Third Embodiment |||||||
|---|---|---|---|---|---|---|
| EFL = 2.766 mm, HFOV = 77.505°, TTL = 10.087 mm, Fno = 2.529, ImgH = 4.000 mm |||||||
| Element | Surface | Radius of curvature (mm) | Spacing (mm) | Refractive index | Abbe number | Focal length (mm) |
| Object | | Infinity | Infinity | | | |
| First lens element 1 | Object-side surface 15 | 27.641 | 0.895 | 1.665 | 54.658 | -3.596 |
| | Image-side surface 16 | 2.180 | 1.162 | | | |
| Second lens element 2 | Object-side surface 25 | -21.689 | 1.305 | 1.642 | 22.409 | 26.564 |
| | Image-side surface 26 | -9.826 | 0.649 | | | |
| Aperture 0 | | Infinity | -0.132 | | | |
| Third lens element 3 | Object-side surface 35 | 3.241 | 0.474 | 1.535 | 56.072 | 7.457 |
| | Image-side surface 36 | 16.152 | 0.045 | | | |
| Fourth lens element 4 | Object-side surface 45 | 4.041 | 0.786 | 1.584 | 59.458 | 3.094 |
| | Image-side surface 46 | -3.056 | 0.193 | | | |
| Fifth lens element 5 | Object-side surface 55 | 9.080 | 0.273 | 1.671 | 19.243 | -4.744 |
| | Image-side surface 56 | 2.349 | 1.279 | | | |
| Sixth lens element 6 | Object-side surface 65 | -10.775 | 0.586 | 1.535 | 56.072 | 5.943 |
| | Image-side surface 66 | -2.509 | 0.829 | | | |
| Seventh lens element 7 | Object-side surface 75 | 7.493 | 0.553 | 1.642 | 22.409 | -6.940 |
| | Image-side surface 76 | 2.729 | 0.530 | | | |
| Filter 9 | Object-side surface 95 | Infinity | 0.210 | 1.517 | 64.167 | |
| | Image-side surface 96 | Infinity | 0.450 | | | |
| | Image plane 99 | Infinity | | | | |

FIG. 16

| Surface | K | $a_2$ | $a_4$ | $a_6$ | $a_8$ |
|---|---|---|---|---|---|
| 25 | 0.000000E+00 | 0.000000E+00 | -1.515863E-02 | 1.228079E-03 | -1.822054E-03 |
| 26 | 0.000000E+00 | 0.000000E+00 | -5.164831E-03 | 1.334210E-02 | -3.787847E-02 |
| 35 | 0.000000E+00 | 0.000000E+00 | 3.089315E-02 | -1.141297E-01 | 4.586620E-01 |
| 36 | 0.000000E+00 | 0.000000E+00 | 2.209293E-02 | -1.035882E-01 | 2.062280E-01 |
| 45 | 0.000000E+00 | 0.000000E+00 | 1.322348E-02 | -5.462337E-02 | 2.488106E-02 |
| 46 | 0.000000E+00 | 0.000000E+00 | 1.163026E-01 | -2.673585E-01 | 5.384494E-01 |
| 55 | 0.000000E+00 | 0.000000E+00 | 2.276724E-02 | -2.179999E-01 | 3.954923E-01 |
| 56 | 4.973023E-01 | 0.000000E+00 | -6.287087E-02 | -3.426083E-02 | 8.303897E-02 |
| 65 | 0.000000E+00 | 0.000000E+00 | 1.524332E-02 | -1.721670E-03 | -9.688386E-03 |
| 66 | 7.998003E-03 | 0.000000E+00 | 4.746606E-02 | -3.933005E-03 | -1.097762E-02 |
| 75 | 0.000000E+00 | 0.000000E+00 | -2.642663E-02 | -2.535630E-03 | 2.130226E-03 |
| 76 | -4.566749E-01 | 0.000000E+00 | -6.453920E-02 | 1.372056E-02 | -2.480572E-03 |
| Surface | $a_{10}$ | $a_{12}$ | $a_{14}$ | $a_{16}$ | |
| 25 | 8.557482E-04 | -2.909315E-04 | 8.627898E-05 | -1.291283E-05 | |
| 26 | 5.330237E-02 | -4.027359E-02 | 1.580297E-02 | -2.511551E-03 | |
| 35 | -1.063888E+00 | 1.386329E+00 | -9.481701E-01 | 2.642669E-01 | |
| 36 | -3.814731E-01 | 4.261953E-01 | -2.487322E-01 | 5.809776E-02 | |
| 45 | -9.906945E-03 | 0.000000E+00 | 0.000000E+00 | 0.000000E+00 | |
| 46 | -7.112075E-01 | 5.424674E-01 | -2.206249E-01 | 3.684590E-02 | |
| 55 | -4.375608E-01 | 2.868297E-01 | -1.016860E-01 | 1.479058E-02 | |
| 56 | -8.011870E-02 | 4.353121E-02 | -1.272938E-02 | 1.522394E-03 | |
| 65 | 3.644552E-03 | 4.484842E-05 | -2.528420E-04 | 3.437494E-05 | |
| 66 | 6.621590E-03 | -1.676393E-03 | 2.031844E-04 | -9.244360E-06 | |
| 75 | -4.201837E-04 | 4.221328E-05 | -2.149989E-06 | 4.169033E-08 | |
| 76 | 3.163438E-04 | -2.688690E-05 | 1.352309E-06 | -3.053317E-08 | |

FIG. 17

| Fourth Embodiment |||||||
|---|---|---|---|---|---|---|
| EFL = 2.704 mm, HFOV = 77.495°, TTL = 11.284 mm, Fno = 2.529, ImgH = 4.000 mm |||||||
| Element | Surface | Radius of curvature (mm) | Spacing (mm) | Refractive index | Abbe number | Focal length (mm) |
| Object | | Infinity | Infinity | | | |
| First lens element 1 | Object-side surface 15 | 19.357 | 1.677 | 1.665 | 54.658 | -4.349 |
| | Image-side surface 16 | 2.437 | 1.022 | | | |
| Second lens element 2 | Object-side surface 25 | -14.631 | 2.098 | 1.642 | 22.409 | 240.116 |
| | Image-side surface 26 | -14.128 | 0.568 | | | |
| Aperture 0 | | Infinity | -0.123 | | | |
| Third lens element 3 | Object-side surface 35 | 2.648 | 0.809 | 1.535 | 56.072 | 5.035 |
| | Image-side surface 36 | 116.753 | 0.108 | | | |
| Fourth lens element 4 | Object-side surface 45 | 3.015 | 0.915 | 1.584 | 59.458 | 3.622 |
| | Image-side surface 46 | -6.382 | 0.071 | | | |
| Fifth lens element 5 | Object-side surface 55 | 6.433 | 0.354 | 1.671 | 19.243 | -4.933 |
| | Image-side surface 56 | 2.154 | 0.911 | | | |
| Sixth lens element 6 | Object-side surface 65 | -14.276 | 0.672 | 1.535 | 56.072 | 7.684 |
| | Image-side surface 66 | -3.253 | 0.330 | | | |
| Seventh lens element 7 | Object-side surface 75 | 7.159 | 0.756 | 1.642 | 22.409 | -7.131 |
| | Image-side surface 76 | 2.692 | 0.530 | | | |
| Filter 9 | Object-side surface 95 | Infinity | 0.210 | 1.517 | 64.167 | |
| | Image-side surface 96 | Infinity | 0.377 | | | |
| | Image plane 99 | Infinity | | | | |

FIG. 20

| Surface | K | $a_2$ | $a_4$ | $a_6$ | $a_8$ |
|---|---|---|---|---|---|
| 25 | 0.000000E+00 | 0.000000E+00 | -1.171874E-02 | 1.106020E-03 | -1.337714E-03 |
| 26 | 0.000000E+00 | 0.000000E+00 | -3.622228E-03 | 1.701638E-02 | -3.931947E-02 |
| 35 | 0.000000E+00 | 0.000000E+00 | 3.344964E-02 | -1.124910E-01 | 4.635314E-01 |
| 36 | 0.000000E+00 | 0.000000E+00 | 3.706486E-02 | -8.775513E-02 | 2.071535E-01 |
| 45 | 0.000000E+00 | 0.000000E+00 | 1.886710E-02 | -4.104538E-02 | 2.565498E-02 |
| 46 | 0.000000E+00 | 0.000000E+00 | 1.156883E-01 | -2.798219E-01 | 5.459087E-01 |
| 55 | 0.000000E+00 | 0.000000E+00 | 2.841871E-02 | -2.157747E-01 | 3.942361E-01 |
| 56 | 5.937117E-01 | 0.000000E+00 | -5.168462E-02 | -3.427156E-02 | 8.169218E-02 |
| 65 | 0.000000E+00 | 0.000000E+00 | 1.930148E-02 | -4.119294E-04 | -9.647871E-03 |
| 66 | -6.195857E-02 | 0.000000E+00 | 5.966642E-02 | -5.242434E-03 | -1.110270E-02 |
| 75 | 0.000000E+00 | 0.000000E+00 | -2.295885E-02 | -2.437476E-03 | 2.120160E-03 |
| 76 | -4.665669E-01 | 0.000000E+00 | -6.446349E-02 | 1.363743E-02 | -2.481572E-03 |
| Surface | $a_{10}$ | $a_{12}$ | $a_{14}$ | $a_{16}$ | |
| 25 | 8.665352E-04 | -3.022977E-04 | 5.574239E-05 | -4.635677E-06 | |
| 26 | 5.116520E-02 | -3.917617E-02 | 1.615162E-02 | -2.763301E-03 | |
| 35 | -1.067651E+00 | 1.389161E+00 | -9.520242E-01 | 2.660489E-01 | |
| 36 | -3.801458E-01 | 4.246934E-01 | -2.511242E-01 | 5.878642E-02 | |
| 45 | -1.070618E-02 | 0.000000E+00 | 0.000000E+00 | 0.000000E+00 | |
| 46 | -7.071329E-01 | 5.421190E-01 | -2.218700E-01 | 3.736753E-02 | |
| 55 | -4.379887E-01 | 2.876680E-01 | -1.008771E-01 | 1.448889E-02 | |
| 56 | -8.051402E-02 | 4.362492E-02 | -1.269872E-02 | 1.481162E-03 | |
| 65 | 3.634249E-03 | 4.115162E-05 | -2.530249E-04 | 3.585957E-05 | |
| 66 | 6.623991E-03 | -1.674714E-03 | 2.027631E-04 | -9.715969E-06 | |
| 75 | -4.220782E-04 | 4.206212E-05 | -2.150168E-06 | 4.452378E-08 | |
| 76 | 3.165767E-04 | -2.685865E-05 | 1.353618E-06 | -3.059513E-08 | |

FIG. 21

| Fifth Embodiment | | | | | | |
|---|---|---|---|---|---|---|
| EFL = 2.900 mm, HFOV = 77.507°, TTL = 11.893 mm, Fno = 2.529, ImgH = 4.000 mm | | | | | | |
| Element | Surface | Radius of curvature (mm) | Spacing (mm) | Refractive index | Abbe number | Focal length (mm) |
| Object | | Infinity | Infinity | | | |
| First lens element 1 | Object-side surface 15 | 11.920 | 0.785 | 1.665 | 54.658 | -6.112 |
| | Image-side surface 16 | 2.959 | 1.528 | | | |
| Second lens element 2 | Object-side surface 25 | -12.952 | 3.171 | 1.642 | 22.409 | -374.226 |
| | Image-side surface 26 | -15.000 | 0.336 | | | |
| Aperture 0 | | Infinity | -0.160 | | | |
| Third lens element 3 | Object-side surface 35 | 2.623 | 0.220 | 1.535 | 56.072 | -265.571 |
| | Image-side surface 36 | 2.500 | 0.057 | | | |
| Fourth lens element 4 | Object-side surface 45 | 2.550 | 0.951 | 1.584 | 59.458 | 3.000 |
| | Image-side surface 46 | -4.890 | 0.144 | | | |
| Fifth lens element 5 | Object-side surface 55 | 4.681 | 0.449 | 1.671 | 19.243 | -7.680 |
| | Image-side surface 56 | 2.371 | 0.985 | | | |
| Sixth lens element 6 | Object-side surface 65 | -25.785 | 0.496 | 1.535 | 56.072 | 5.487 |
| | Image-side surface 66 | -2.662 | 0.600 | | | |
| Seventh lens element 7 | Object-side surface 75 | 7.184 | 0.580 | 1.642 | 22.409 | -6.627 |
| | Image-side surface 76 | 2.603 | 0.530 | | | |
| Filter 9 | Object-side surface 95 | Infinity | 0.210 | 1.517 | 64.167 | |
| | Image-side surface 96 | Infinity | 1.011 | | | |
| | Image plane 99 | Infinity | | | | |

FIG. 24

| Surface | K | $a_2$ | $a_4$ | $a_6$ | $a_8$ |
|---|---|---|---|---|---|
| 25 | 0.000000E+00 | 0.000000E+00 | -8.980612E-03 | 1.607049E-03 | -1.282032E-03 |
| 26 | 0.000000E+00 | 0.000000E+00 | -6.204907E-03 | 1.806779E-02 | -3.622261E-02 |
| 35 | 0.000000E+00 | 0.000000E+00 | 4.041913E-03 | -1.062395E-01 | 4.601218E-01 |
| 36 | 0.000000E+00 | 0.000000E+00 | 1.477283E-02 | -1.008959E-01 | 2.144156E-01 |
| 45 | 0.000000E+00 | 0.000000E+00 | 2.082222E-02 | -4.559297E-02 | 3.011030E-02 |
| 46 | 0.000000E+00 | 0.000000E+00 | 7.340036E-02 | -2.523508E-01 | 5.428389E-01 |
| 55 | 0.000000E+00 | 0.000000E+00 | 6.188926E-03 | -2.085445E-01 | 3.926969E-01 |
| 56 | 5.380936E-01 | 0.000000E+00 | -5.349147E-02 | -4.220529E-02 | 8.300124E-02 |
| 65 | 0.000000E+00 | 0.000000E+00 | 1.794899E-02 | -1.475741E-06 | -1.009005E-02 |
| 66 | 1.329376E-03 | 0.000000E+00 | 5.817598E-02 | -5.147357E-03 | -1.095777E-02 |
| 75 | 0.000000E+00 | 0.000000E+00 | -2.259710E-02 | -2.334688E-03 | 2.126629E-03 |
| 76 | -4.870886E-01 | 0.000000E+00 | -6.188515E-02 | 1.365940E-02 | -2.481706E-03 |
| Surface | $a_{10}$ | $a_{12}$ | $a_{14}$ | $a_{16}$ | |
| 25 | 8.563634E-04 | -3.045423E-04 | 5.314807E-05 | -3.591789E-06 | |
| 26 | 4.859145E-02 | -3.840365E-02 | 1.662234E-02 | -3.065005E-03 | |
| 35 | -1.073725E+00 | 1.397459E+00 | -9.410043E-01 | 2.539610E-01 | |
| 36 | -3.753661E-01 | 4.168941E-01 | -2.598575E-01 | 6.575089E-02 | |
| 45 | -1.692330E-02 | 0.000000E+00 | 0.000000E+00 | 0.000000E+00 | |
| 46 | -7.125375E-01 | 5.413265E-01 | -2.209670E-01 | 3.739479E-02 | |
| 55 | -4.393329E-01 | 2.874417E-01 | -1.008212E-01 | 1.467838E-02 | |
| 56 | -7.900483E-02 | 4.371770E-02 | -1.289703E-02 | 1.546671E-03 | |
| 65 | 3.566193E-03 | 4.765606E-05 | -2.469468E-04 | 3.642342E-05 | |
| 66 | 6.641740E-03 | -1.674132E-03 | 2.032960E-04 | -8.985400E-06 | |
| 75 | -4.219862E-04 | 4.201944E-05 | -2.155889E-06 | 4.463961E-08 | |
| 76 | 3.164796E-04 | -2.687267E-05 | 1.351930E-06 | -3.083449E-08 | |

FIG. 25

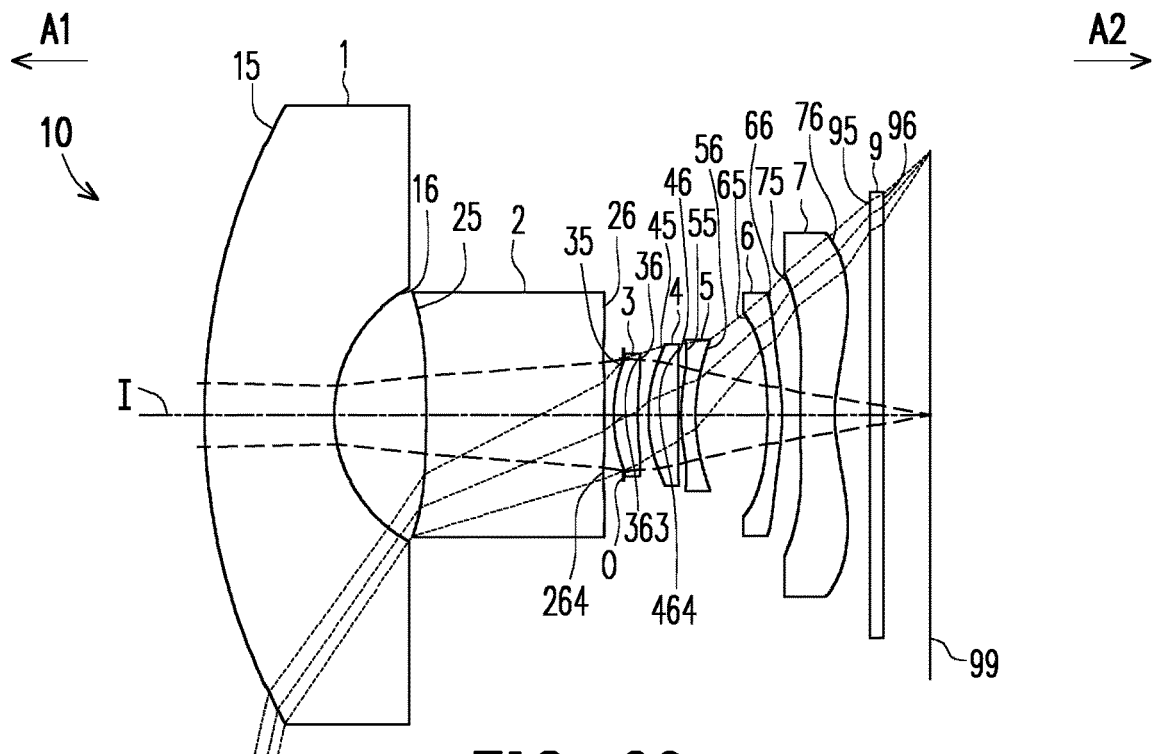
FIG. 26
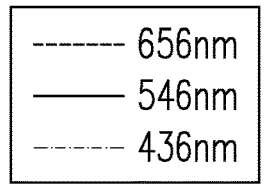
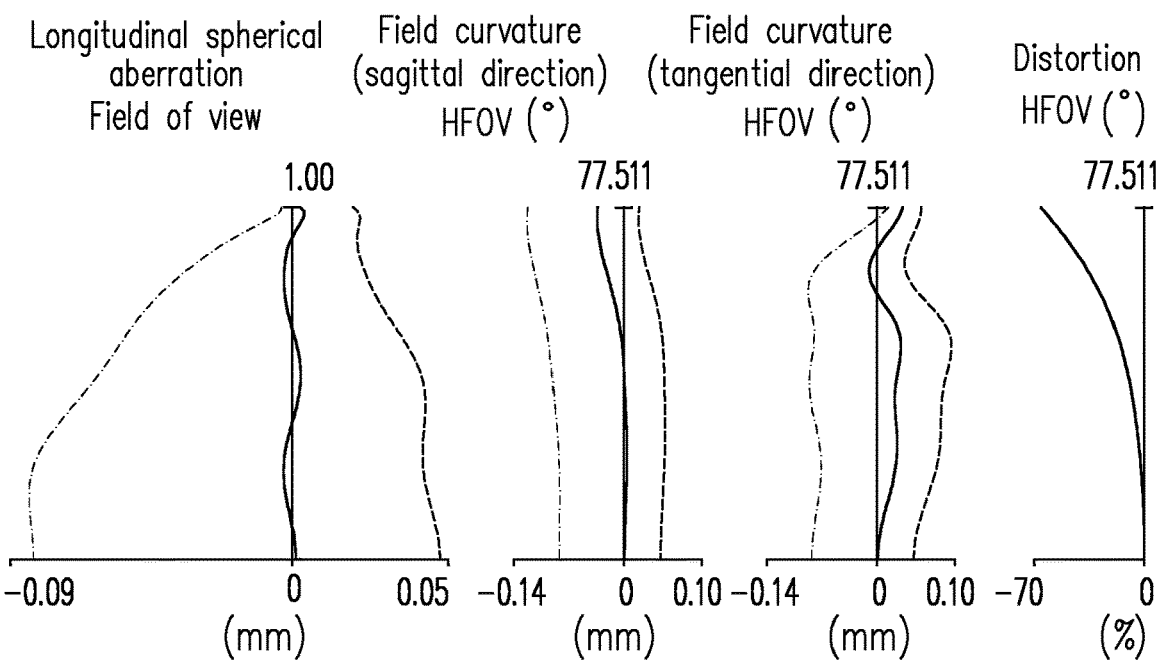
FIG. 27A  FIG. 27B  FIG. 27C  FIG. 27D

| Sixth Embodiment | | | | | | |
|---|---|---|---|---|---|---|
| EFL = 2.583 mm, HFOV = 77.511°, TTL = 11.030 mm, Fno = 2.529, ImgH = 4.000 mm | | | | | | |
| Element | Surface | Radius of curvature (mm) | Spacing (mm) | Refractive index | Abbe number | Focal length (mm) |
| Object | | Infinity | Infinity | | | |
| First lens element 1 | Object-side surface 15 | 9.652 | 1.965 | 1.665 | 54.658 | -4.798 |
| | Image-side surface 16 | 2.209 | 1.400 | | | |
| Second lens element 2 | Object-side surface 25 | -23.276 | 2.701 | 1.642 | 22.409 | 56.330 |
| | Image-side surface 26 | -14.864 | 0.299 | | | |
| Aperture 0 | | Infinity | -0.153 | | | |
| Third lens element 3 | Object-side surface 35 | 2.390 | 0.367 | 1.535 | 56.072 | 8.213 |
| | Image-side surface 36 | 4.940 | 0.164 | | | |
| Fourth lens element 4 | Object-side surface 45 | 2.645 | 0.453 | 1.584 | 59.458 | 4.074 |
| | Image-side surface 46 | -23.092 | 0.045 | | | |
| Fifth lens element 5 | Object-side surface 55 | 2.800 | 0.220 | 1.671 | 19.243 | 129.763 |
| | Image-side surface 56 | 2.800 | 1.097 | | | |
| Sixth lens element 6 | Object-side surface 65 | -5.843 | 0.221 | 1.535 | 56.072 | 16.170 |
| | Image-side surface 66 | -3.539 | 0.279 | | | |
| Seventh lens element 7 | Object-side surface 75 | 14.921 | 0.517 | 1.642 | 22.409 | -5.478 |
| | Image-side surface 76 | 2.830 | 0.530 | | | |
| Filter 9 | Object-side surface 95 | Infinity | 0.210 | 1.517 | 64.167 | |
| | Image-side surface 96 | Infinity | 0.714 | | | |
| | Image plane 99 | Infinity | | | | |

FIG. 28

| Surface | K | $a_2$ | $a_4$ | $a_6$ | $a_8$ |
|---|---|---|---|---|---|
| 25 | 0.000000E+00 | 0.000000E+00 | -1.280631E-02 | 1.311833E-03 | -1.254096E-03 |
| 26 | 0.000000E+00 | 0.000000E+00 | 2.941696E-02 | 3.210153E-02 | -4.930751E-02 |
| 35 | 0.000000E+00 | 0.000000E+00 | 4.390756E-02 | -1.166580E-01 | 4.451506E-01 |
| 36 | 0.000000E+00 | 0.000000E+00 | -8.701129E-03 | -1.260861E-01 | 1.912264E-01 |
| 45 | 0.000000E+00 | 0.000000E+00 | 7.431465E-02 | -7.187261E-02 | 4.599413E-02 |
| 46 | 0.000000E+00 | 0.000000E+00 | 7.365097E-02 | -2.303878E-01 | 5.526525E-01 |
| 55 | 0.000000E+00 | 0.000000E+00 | -3.883821E-02 | -2.060334E-01 | 3.757848E-01 |
| 56 | 2.292349E+00 | 0.000000E+00 | -9.420547E-03 | -7.012804E-02 | 8.486096E-02 |
| 65 | 0.000000E+00 | 0.000000E+00 | -1.120281E-02 | 1.038714E-03 | -9.667058E-03 |
| 66 | -3.947004E-01 | 0.000000E+00 | 6.190089E-02 | -5.520787E-03 | -1.120393E-02 |
| 75 | 0.000000E+00 | 0.000000E+00 | -2.439979E-02 | -2.430064E-03 | 2.104453E-03 |
| 76 | -4.987759E-01 | 0.000000E+00 | -6.512097E-02 | 1.348616E-02 | -2.487902E-03 |
| Surface | $a_{10}$ | $a_{12}$ | $a_{14}$ | $a_{16}$ | |
| 25 | 8.454957E-04 | -3.018203E-04 | 5.591825E-05 | -4.194283E-06 | |
| 26 | 4.397565E-02 | -2.971350E-02 | 2.538517E-02 | -1.140246E-02 | |
| 35 | -1.069264E+00 | 1.399257E+00 | -9.501578E-01 | 2.422419E-01 | |
| 36 | -3.719007E-01 | 4.319908E-01 | -2.501040E-01 | 3.337056E-02 | |
| 45 | -2.450708E-02 | 0.000000E+00 | 0.000000E+00 | 0.000000E+00 | |
| 46 | -7.257152E-01 | 5.288353E-01 | -2.225051E-01 | 4.908030E-02 | |
| 55 | -4.490657E-01 | 2.901832E-01 | -9.439182E-02 | 1.558327E-02 | |
| 56 | -7.195135E-02 | 4.443995E-02 | -1.449984E-02 | 1.616034E-03 | |
| 65 | 3.504348E-03 | 2.661268E-05 | -2.294882E-04 | 3.081412E-05 | |
| 66 | 6.578626E-03 | -1.688797E-03 | 2.010324E-04 | -9.004833E-06 | |
| 75 | -4.279796E-04 | 4.081226E-05 | -2.321602E-06 | 4.272976E-08 | |
| 76 | 3.165794E-04 | -2.685624E-05 | 1.345501E-06 | -3.355416E-08 | |

FIG. 29

| Conditional Expression | First Embodiment | Second Embodiment | Third Embodiment | Fourth Embodiment | Fifth Embodiment | Sixth Embodiment |
|---|---|---|---|---|---|---|
| T1 | 0.733 | 1.364 | 0.895 | 1.677 | 0.785 | 1.965 |
| G12 | 2.379 | 1.096 | 1.162 | 1.022 | 1.528 | 1.400 |
| T2 | 2.785 | 1.755 | 1.305 | 2.098 | 3.171 | 2.701 |
| G23 | 0.361 | 0.543 | 0.517 | 0.445 | 0.176 | 0.146 |
| T3 | 0.293 | 0.376 | 0.474 | 0.809 | 0.220 | 0.367 |
| G34 | 0.128 | 0.154 | 0.045 | 0.108 | 0.057 | 0.164 |
| T4 | 0.824 | 0.759 | 0.786 | 0.915 | 0.951 | 0.453 |
| G45 | 0.134 | 0.098 | 0.193 | 0.071 | 0.144 | 0.045 |
| T5 | 0.388 | 0.367 | 0.273 | 0.354 | 0.449 | 0.220 |
| G56 | 1.096 | 0.950 | 1.279 | 0.911 | 0.985 | 1.097 |
| T6 | 0.463 | 0.424 | 0.586 | 0.672 | 0.496 | 0.221 |
| G67 | 0.261 | 0.336 | 0.829 | 0.330 | 0.600 | 0.279 |
| T7 | 0.653 | 0.827 | 0.553 | 0.756 | 0.580 | 0.517 |
| G7F | 0.530 | 0.530 | 0.530 | 0.530 | 0.530 | 0.530 |
| TF | 0.210 | 0.210 | 0.210 | 0.210 | 0.210 | 0.210 |
| GFP | 0.730 | 0.805 | 0.450 | 0.377 | 1.011 | 0.714 |
| BFL | 1.470 | 1.545 | 1.190 | 1.117 | 1.751 | 1.454 |
| EFL | 2.921 | 2.864 | 2.766 | 2.704 | 2.900 | 2.583 |
| TTL | 11.969 | 10.595 | 10.087 | 11.284 | 11.893 | 11.030 |
| TL | 10.498 | 9.050 | 8.897 | 10.167 | 10.142 | 9.576 |
| ALT | 6.139 | 5.872 | 4.872 | 7.280 | 6.653 | 6.445 |
| AAG | 4.360 | 3.178 | 4.025 | 2.887 | 3.489 | 3.131 |
| SG5G6 | 1.357 | 1.286 | 2.108 | 1.241 | 1.585 | 1.376 |
| DG5G6 | 1.820 | 1.710 | 2.694 | 1.912 | 2.080 | 1.597 |
| DT2G5 | 6.008 | 5.003 | 4.872 | 5.710 | 6.154 | 5.194 |

FIG. 30

| Conditional Expression | First Embodiment | Second Embodiment | Third Embodiment | Fourth Embodiment | Fifth Embodiment | Sixth Embodiment |
|---|---|---|---|---|---|---|
| SG5G6/(G45+T5) | 2.600 | 2.761 | 4.520 | 2.914 | 2.673 | 5.192 |
| DG5G6/(T4+G45) | 1.900 | 1.995 | 2.752 | 1.940 | 1.900 | 3.204 |
| DT2G5/(T6+T7) | 5.383 | 4.000 | 4.276 | 4.000 | 5.720 | 7.040 |
| (G12+T2)/(T4+T5+T6) | 3.085 | 1.838 | 1.500 | 1.608 | 2.479 | 4.585 |
| ALT/BFL | 4.175 | 3.800 | 4.096 | 6.519 | 3.800 | 4.433 |
| (G56+G67)/T5 | 3.500 | 3.500 | 7.720 | 3.500 | 3.529 | 6.253 |
| (T1+G56)/T7 | 2.800 | 2.800 | 3.929 | 3.423 | 3.052 | 5.928 |
| AAG/(T1+T4) | 2.800 | 1.497 | 2.395 | 1.114 | 2.010 | 1.294 |
| T2/(T1+G45) | 3.209 | 1.200 | 1.200 | 1.200 | 3.414 | 1.344 |
| TTL/(T1+G12+T2) | 2.029 | 2.514 | 3.000 | 2.352 | 2.168 | 1.818 |
| (EFL+T5)/G56 | 3.018 | 3.401 | 2.376 | 3.359 | 3.400 | 2.556 |
| TL/(T2+T3) | 3.411 | 4.246 | 5.000 | 3.498 | 2.990 | 3.121 |
| V2+V3+V4 | 120.519 | 137.939 | 137.939 | 137.939 | 137.939 | 137.939 |
| V5+V6+V7 | 109.787 | 97.724 | 97.724 | 97.724 | 97.724 | 97.724 |
| TL/(G12+T2+G56) | 1.677 | 2.381 | 2.375 | 2.523 | 1.784 | 1.842 |
| (T6+G67+T7)/T1 | 1.878 | 1.163 | 2.200 | 1.048 | 2.134 | 0.517 |
| EFL/(G12+G67) | 1.106 | 2.000 | 1.389 | 2.000 | 1.363 | 1.538 |
| T1/(G23+G34) | 1.500 | 1.956 | 1.593 | 3.032 | 3.373 | 6.334 |
| (T2+T3)/T5 | 7.937 | 5.800 | 6.517 | 8.199 | 7.553 | 13.948 |
| EFL/T7 | 4.470 | 3.465 | 5.000 | 3.577 | 5.000 | 5.000 |

FIG. 31

OPTICAL IMAGING LENS

CROSS-REFERENCE TO RELATED APPLICATION

This application claims the priority benefit of China application serial no. 202110316182.3, filed on Mar. 24, 2021. The entirety of the above-mentioned patent application is hereby incorporated by reference herein and made a part of this specification.

BACKGROUND

Technical Field

The disclosure relates to an optical element, and particularly to an optical imaging lens.

Description of Related Art

In recent years, optical imaging lenses have continued to evolve. In addition to the requirements for light, thin, short, and small lenses, it is also more and more important to have a large field of view while having good lens imaging quality. However, in order to cope with such demand, increasing the number of optical lens elements will increase the distance from an object-side surface of a first lens element to an image plane on an optical axis, which is disadvantageous to the thinning of the optical imaging lens. Therefore, providing an optical imaging lens that is light, thin, short, and small while having a large field of view and maintaining good imaging quality has always been the developmental goal of the design.

SUMMARY

The disclosure provides an optical imaging lens, which can provide a lens with a large field of view and a short lens length while maintaining good imaging quality. The optical imaging lens may be used to capture images and record videos, and is, for example, a portable electronic device such as a mobile phone, a camera, a tablet, and a personal digital assistant (PDA), which may also be used in the field of aerial photography that requires a large field of view.

An embodiment of the disclosure provides an optical imaging lens, which includes a first lens element, a second lens element, a third lens element, a fourth lens element, a fifth lens element, a sixth lens element, and a seventh lens element arranged in sequence from an object side to an image side along an optical axis. Each of the first lens element to the seventh lens element includes an object-side surface facing the object side and allowing imaging rays to pass through, and an image-side surface facing the image side and allowing the imaging rays to pass through. An optical axis region of the image-side surface of the first lens element is concave. A periphery region of the object-side surface of the second lens element is concave, and an optical axis region of the image-side surface of the second lens element is convex. The seventh lens element has negative refracting power, and an optical axis region of the image-side surface of the seventh lens element is concave. Lens elements of the optical imaging lens are only the seven lens elements described above, and the optical imaging lens satisfies the following conditional expression: $SG5G6/(G45+T5) \geq 2.600$, where $SG5G6$ is a sum of an air gap between the fifth lens element and the sixth lens element on the optical axis and an air gap between the sixth lens element and the seventh lens element on the optical axis, $G45$ is an air gap between the fourth lens element and the fifth lens element on the optical axis, and $T5$ is a thickness of the fifth lens element on the optical axis.

An embodiment of the disclosure provides an optical imaging lens, which includes a first lens element, a second lens element, a third lens element, a fourth lens element, a fifth lens element, a sixth lens element, and a seventh lens element arranged in sequence from an object side to an image side along an optical axis. Each of the first lens element to the seventh lens element includes an object-side surface facing the object side and allowing imaging rays to pass through, and an image-side surface facing the image side and allowing the imaging rays to pass through. The first lens element has negative refracting power, and an optical axis region of the object-side surface of the first lens element is convex. A periphery region of the object-side surface of the second lens element is concave, and an optical axis region of the image-side surface of the second lens element is convex. The fourth lens element has positive refracting power. The sixth lens element has positive refracting power, and a periphery region of the object-side surface of the sixth lens element is concave. Lens elements of the optical imaging lens are only the seven lens elements described above, and the optical imaging lens satisfies the following conditional expression: $DG5G6/(T4+G45) \geq 1.900$, where $DG5G6$ is a distance from the image-side surface of the fifth lens element to the object-side surface of the seventh lens element on the optical axis, $T4$ is a thickness of the fourth lens element on the optical axis, and $G45$ is an air gap between the fourth lens element and the fifth lens element on the optical axis.

An embodiment of the disclosure provides an optical imaging lens, which includes a first lens element, a second lens element, a third lens element, a fourth lens element, a fifth lens element, a sixth lens element, and a seventh lens element arranged in sequence from an object side to an image side along an optical axis. Each of the first lens element to the seventh lens element includes an object-side surface facing the object side and allowing imaging rays to pass through, and an image-side surface facing the image side and allowing the imaging rays to pass through. An optical axis region of the object-side surface of the first lens element is convex. A periphery region of the object-side surface of the second lens element is concave, and an optical axis region of the image-side surface of the second lens element is convex. A periphery region of the image-side surface of the fifth lens element is concave. A periphery region of the image-side surface of the sixth lens element is convex. The seventh lens element has negative refracting power. Lens elements of the optical imaging lens are only the seven lens elements described above, and the optical imaging lens satisfies the following conditional expression: $DT2G5/(T6+T7) \geq 4.000$, where $DT2G5$ is a distance from the object-side surface of the second lens element to the object-side surface of the sixth lens element on the optical axis, $T6$ is a thickness of the sixth lens element on the optical axis, and $T7$ is a thickness of the seventh lens element on the optical axis.

Based on the above, the advantages of the optical imaging lens of the embodiments of the disclosure are that by satisfying the number of lens elements, the surface design of the lens elements, and the conditional expressions, the optical imaging lens of the embodiments of the disclosure can provide a lens with a large field of view and a short lens length, and good imaging quality.

In order for the features and advantages of the disclosure to be more comprehensible, the following specific embodiments are described in detail in conjunction with the accompanying drawings.

BRIEF DESCRIPTION OF THE DRAWINGS

FIG. 3 is a schematic diagram of a surface structure of a lens element according to Example 1.

FIG. 4 is a schematic diagram of a surface structure of a lens element according to Example 2.

FIG. 5 is a schematic diagram of a surface structure of a lens element according to Example 3.

FIG. 6 is a schematic diagram of an optical imaging lens according to a first embodiment of the disclosure.

FIG. 7A to FIG. 7D are diagrams of longitudinal spherical aberration and various aberrations of the optical imaging lens according to the first embodiment.

FIG. 8 shows detailed optical data of the optical imaging lens according to the first embodiment of the disclosure.

FIG. 9 shows aspheric parameters of the optical imaging lens according to the first embodiment of the disclosure.

FIG. 12 shows detailed optical data of the optical imaging lens according to the second embodiment of the disclosure.

FIG. 13 shows aspheric parameters of the optical imaging lens according to the second embodiment of the disclosure.

FIG. 14 is a schematic diagram of an optical imaging lens according to a third embodiment of the disclosure.

FIG. 15A to FIG. 15D are diagrams of longitudinal spherical aberration and various aberrations of the optical imaging lens according to the third embodiment.

FIG. 16 shows detailed optical data of the optical imaging lens according to the third embodiment of the disclosure.

FIG. 17 shows aspheric parameters of the optical imaging lens according to the third embodiment of the disclosure.

FIG. 20 shows detailed optical data of the optical imaging lens according to the fourth embodiment of the disclosure.

FIG. 21 shows aspherical parameters of the optical imaging lens according to the fourth embodiment of the disclosure.

FIG. 24 shows detailed optical data of the optical imaging lens according to the fifth embodiment of the disclosure.

FIG. 25 shows aspheric parameters of the optical imaging lens according to the fifth embodiment of the disclosure.

FIG. 26 is a schematic diagram of an optical imaging lens according to a sixth embodiment of the disclosure.

FIG. 27A to FIG. 27D are diagrams of longitudinal spherical aberration and various aberrations of the optical imaging lens according to the sixth embodiment.

FIG. 28 shows detailed optical data of the optical imaging lens according to the sixth embodiment of the disclosure.

FIG. 29 shows aspheric parameters of the optical imaging lens according to the sixth embodiment of the disclosure.

FIG. 30 and FIG. 31 show values of important parameters and conditional expressions thereof of the optical imaging lenses according to the first to sixth embodiments of the disclosure.

DETAILED DESCRIPTION OF DISCLOSED EMBODIMENTS

The terms "optical axis region", "periphery region", "concave", and "convex" used in this specification and claims should be interpreted based on the definition listed in the specification by the principle of lexicographer.

Figure 1:
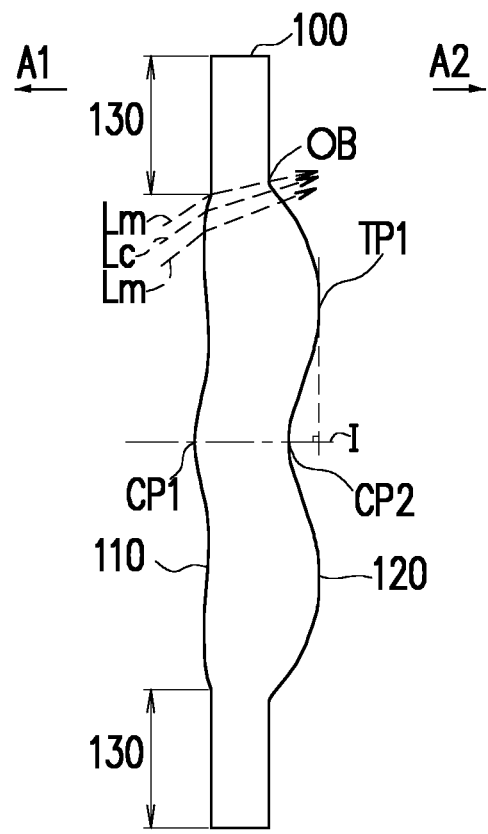
FIG. 1 is a schematic diagram of a surface structure of a lens element.

In the present disclosure, the optical system may comprise at least one lens element to receive imaging rays that are incident on the optical system over a set of angles ranging from parallel to an optical axis to a half field of view (HFOV) angle with respect to the optical axis. The imaging rays pass through the optical system to produce an image on an image plane. The term "a lens element having positive refracting power (or negative refracting power)" means that the paraxial refracting power of the lens element in Gaussian optics is positive (or negative). The term "an object-side (or image-side) surface of a lens element" refers to a specific region of that surface of the lens element at which imaging rays can pass through that specific region. Imaging rays include at least two types of rays: a chief ray Lc and a marginal ray Lm (as shown in FIG. 1). An object-side (or image-side) surface of a lens element can be characterized as having several regions, including an optical axis region, a periphery region, and, in some cases, one or more intermediate regions, as discussed more fully below.

FIG. 1 is a radial cross-sectional view of a lens element 100. Two referential points for the surfaces of the lens element 100 can be defined: a central point, and a transition point. The central point of a surface of a lens element is a point of intersection of that surface and the optical axis I. As illustrated in FIG. 1, a first central point CP1 may be present on the object-side surface 110 of lens element 100 and a second central point CP2 may be present on the image-side surface 120 of the lens element 100. The transition point is a point on a surface of a lens element, at which the line tangent to that point is perpendicular to the optical axis I. The optical boundary OB of a surface of the lens element is defined as a point at which the radially outermost marginal ray Lm passing through the surface of the lens element intersects the surface of the lens element. All transition points lie between the optical axis I and the optical boundary OB of the surface of the lens element. A surface of the lens element 100 may have no transition point or have at least one transition point. If multiple transition points are present on a single surface, then these transition points are sequentially named along the radial direction of the surface with reference numerals starting from the first transition point. For example, the first transition point, e.g., TP1, (closest to the optical axis I), the second transition point, e.g., TP2, (as shown in FIG. 4), and the Nth transition point (farthest from the optical axis I).

When a surface of the lens element has at least one transition point, the region of the surface of the lens element from the central point to the first transition point TP1 is defined as the optical axis region, which includes the central point. The region located radially outside of the farthest transition point (the Nth transition point) from the optical axis I to the optical boundary OB of the surface of the lens element is defined as the periphery region. In some embodiments, there may be intermediate regions present between the optical axis region and the periphery region, with the number of intermediate regions depending on the number of the transition points. When a surface of the lens element has no transition point, the optical axis region is defined as a region of 0%-50% of the distance between the optical axis I and the optical boundary OB of the surface of the lens element, and the periphery region is defined as a region of 50%-100% of the distance between the optical axis I and the optical boundary OB of the surface of the lens element.

The shape of a region is convex if a collimated ray being parallel to the optical axis I and passing through the region is bent toward the optical axis I such that the ray intersects the optical axis I on the image side A2 of the lens element. The shape of a region is concave if the extension line of a collimated ray being parallel to the optical axis I and passing through the region intersects the optical axis I on the object side A1 of the lens element.

Additionally, referring to FIG. 1, the lens element 100 may also have a mounting portion 130 extending radially outward from the optical boundary OB. The mounting portion 130 is typically used to physically secure the lens element to a corresponding element of the optical system (not shown). Imaging rays do not reach the mounting portion 130. The structure and shape of the mounting portion 130 are only examples to explain the technologies, and should not be taken as limiting the scope of the present disclosure. The mounting portion 130 of the lens elements discussed below may be partially or completely omitted in the following drawings.

Figure 2:
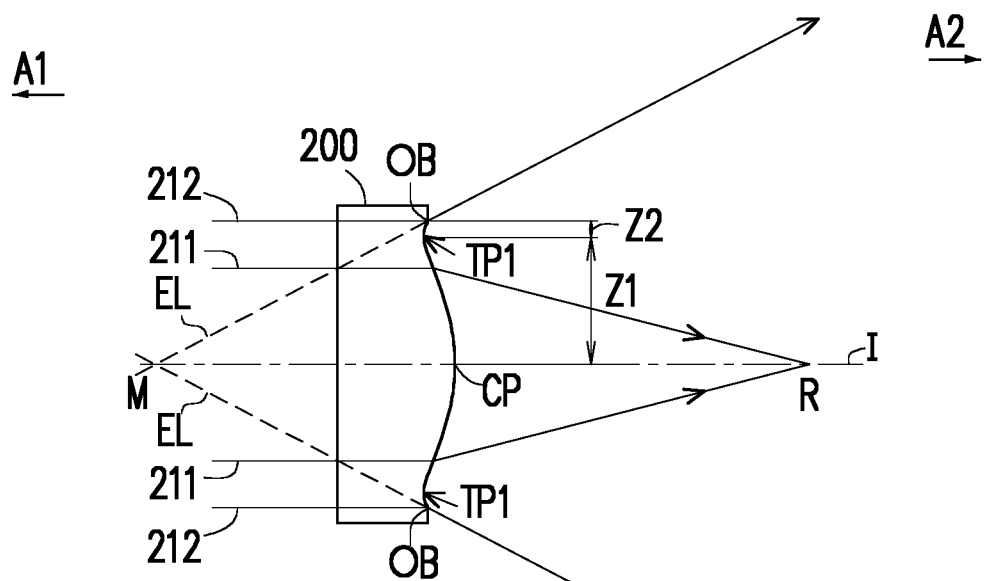
FIG. 2 is a schematic diagram of a surface concave-convex structure of a lens element and focal points of rays.

Referring to FIG. 2, optical axis region Z1 is defined between central point CP and first transition point TP1. Periphery region Z2 is defined between TP1 and the optical boundary OB of the surface of the lens element. Collimated ray 211 intersects the optical axis I on the image side A2 of lens element 200 after passing through optical axis region Z1, i.e., the focal point of collimated ray 211 after passing through optical axis region Z1 is on the image side A2 of the lens element 200 at point R in FIG. 2. Accordingly, since the ray itself intersects the optical axis I on the image side A2 of the lens element 200, optical axis region Z1 is convex. On the contrary, collimated ray 212 diverges after passing through periphery region Z2. The extension line EL of collimated ray 212 after passing through periphery region Z2 intersects the optical axis I on the object side A1 of lens element 200, i.e., the focal point of collimated ray 212 after passing through periphery region Z2 is on the object side A1 at point M in FIG. 2. Accordingly, since the extension line EL of the ray intersects the optical axis I on the object side A1 of the lens element 200, periphery region Z2 is concave. In the lens element 200 illustrated in FIG. 2, the first transition point TP1 is the border of the optical axis region and the periphery region, i.e., TP1 is the point at which the shape changes from convex to concave.

Alternatively, there is another way for a person having ordinary skill in the art to determine whether an optical axis region is convex or concave by referring to the sign of "Radius of curvature" (the "R" value), which is the paraxial radius of shape of a lens surface in the optical axis region. The R value is commonly used in conventional optical design software such as Zemax and CodeV. The R value usually appears in the lens data sheet in the software. For an object-side surface, a positive R value defines that the optical axis region of the object-side surface is convex, and a negative R value defines that the optical axis region of the object-side surface is concave. Conversely, for an image-side surface, a positive R value defines that the optical axis region of the image-side surface is concave, and a negative R value defines that the optical axis region of the image-side surface is convex. The result found by using this method should be consistent with the method utilizing intersection of the optical axis by rays/extension lines mentioned above, which determines surface shape by referring to whether the focal point of a collimated ray being parallel to the optical axis I is on the object-side or the image-side of a lens element. As used herein, the terms "a shape of a region is convex (concave)," "a region is convex (concave)," and "a convex- (concave-) region," can be used alternatively.

FIG. 3, FIG. 4 and FIG. 5 illustrate examples of determining the shape of lens element regions and the boundaries of regions under various circumstances, including the optical axis region, the periphery region, and intermediate regions as set forth in the present specification.

FIG. 3 is a radial cross-sectional view of a lens element 300. As illustrated in FIG. 3, only one transition point TP1 appears within the optical boundary OB of the image-side surface 320 of the lens element 300. Optical axis region Z1 and periphery region Z2 of the image-side surface 320 of lens element 300 are illustrated. The R value of the image-side surface 320 is positive (i.e., R>0). Accordingly, the optical axis region Z1 is concave.

In general, the shape of each region demarcated by the transition point will have an opposite shape to the shape of the adjacent region(s). Accordingly, the transition point will define a transition in shape, changing from concave to convex at the transition point or changing from convex to concave. In FIG. 3, since the shape of the optical axis region Z1 is concave, the shape of the periphery region Z2 will be convex as the shape changes at the transition point TP1.

FIG. 4 is a radial cross-sectional view of a lens element 400. Referring to FIG. 4, a first transition point TP1 and a second transition point TP2 are present on the object-side surface 410 of lens element 400. The optical axis region Z1 of the object-side surface 410 is defined between the optical axis I and the first transition point TP1. The R value of the object-side surface 410 is positive (i.e., R>0). Accordingly, the optical axis region Z1 is convex.

The periphery region Z2 of the object-side surface 410, which is also convex, is defined between the second transition point TP2 and the optical boundary OB of the object-side surface 410 of the lens element 400. Further, intermediate region Z3 of the object-side surface 410, which is concave, is defined between the first transition point TP1 and the second transition point TP2. Referring once again to FIG. 4, the object-side surface 410 includes an optical axis region Z1 located between the optical axis I and the first transition point TP1, an intermediate region Z3 located between the first transition point TP1 and the second transition point TP2, and a periphery region Z2 located between the second transition point TP2 and the optical boundary OB of the object-side surface 410. Since the shape of the optical axis region Z1 is designed to be convex, the shape of the intermediate region Z3 is concave as the shape of the intermediate region Z3 changes at the first transition point TP1, and the shape of the periphery region Z2 is convex as the shape of the periphery region Z2 changes at the second transition point TP2.

FIG. 5 is a radial cross-sectional view of a lens element 500. Lens element 500 has no transition point on the object-side surface 510 of the lens element 500. For a surface of a lens element with no transition point, for example, the object-side surface 510 the lens element 500, the optical axis region Z1 is defined as the region of 0%-50% of the distance between the optical axis I and the optical boundary OB of the surface of the lens element and the periphery region is defined as the region of 50%-100% of the distance between the optical axis I and the optical boundary OB of the surface of the lens element. Referring to lens element 500 illustrated in FIG. 5, the optical axis region Z1 of the object-side surface 510 is defined between the optical axis I and 50% of the distance between the optical axis I and the optical boundary OB. The R value of the object-side surface 510 is positive (i.e., R>0). Accordingly, the optical axis region Z1 is convex. For the object-side surface 510 of the lens element 500, because there is no transition point, the periphery region Z2 of the object-side surface 510 is also convex. It should be noted that lens element 500 may have a mounting portion (not shown) extending radially outward from the periphery region Z2.

FIG. 6 is a schematic diagram of an optical imaging lens according to a first embodiment of the disclosure. FIG. 7A to FIG. 7D are diagrams of longitudinal spherical aberration and various aberrations of the optical imaging lens according to the first embodiment. Referring to FIG. 6 first, an optical imaging lens 10 according to the first embodiment of the disclosure includes a first lens element 1, a second lens element 2, an aperture 0, a third lens element 3, a fourth lens element 4, a fifth lens element 5, a sixth lens element 6, a seventh lens element 7, and a filter 9 arranged in sequence from an object side A1 to an image side A2 along an optical axis I of the optical imaging lens 10. After rays emitted by an object to be shot enter the optical imaging lens 10 and sequentially pass through the first lens element 1, the second lens element 2, the aperture 0, the third lens element 3, the fourth lens element 4, the fifth lens element 5, the sixth lens element 6, the seventh lens element 7, and the filter 9, an image is formed on an image plane 99. It is supplemented that the object side A1 is a side facing the object to be shot, and the image side A2 is a side facing the image plane 99.

In this embodiment, each of the first lens element 1, the second lens element 2, the third lens element 3, the fourth lens element 4, the fifth lens element 5, the sixth lens element 6, the seventh lens element 7, and the filter 9 of the optical imaging lens 10 has an object-side surface 15, 25, 35, 45, 55, 65, 75, or 95 facing the object side A1 and allowing imaging rays to pass and an image-side surface 16, 26, 36, 46, 56, 66, 76, or 96 facing the image side A2 and allowing the imaging rays to pass through. In this embodiment, the aperture 0 is disposed between the image-side surface 26 of the second lens element 2 and the object-side surface 35 of the third lens element 3. The filter 9 is disposed between the image-side surface 76 of the seventh lens element 7 and the image plane 99. The filter 9 is an infrared (IR) cut filter that may allow rays of other wavelengths to pass through and block rays of IR wavelengths, but the disclosure is not limited thereto.

The first lens element 1 has negative refracting power. The material of the first lens element 1 is glass, but the disclosure is not limited thereto. An optical axis region 151 of the object-side surface 15 of the first lens element 1 is convex, and a periphery region 153 thereof is convex. An optical axis region 162 of the image-side surface 16 of the first lens element 1 is concave, and a periphery region 164 thereof is concave. In this embodiment, the object-side surface 15 and the image-side surface 16 of the first lens element 1 are both spheric surfaces, but the disclosure is not limited thereto.

The second lens element 2 has positive refracting power. The material of the second lens element 2 is plastic, but the disclosure is not limited thereto. An optical axis region 252 of the object-side surface 25 of the second lens element 2 is concave, and a periphery region 254 thereof is concave. An optical axis region 261 of the image-side surface 26 of the second lens element 2 is convex, and a periphery region 263 thereof is convex. In this embodiment, the object-side surface 25 and the image-side surface 26 of the second lens element 2 are both aspheric surfaces.

The third lens element 3 has positive refracting power. The material of the third lens element 3 is plastic, but the disclosure is not limited thereto. An optical axis region 351 of the object-side surface 35 of the third lens element 3 is convex, and a periphery region 353 thereof is convex. An optical axis region 362 of the image-side surface 36 of the third lens element 3 is concave, and a periphery region 364 thereof is concave. In this embodiment, the object-side surface 35 and the image-side surface 36 of the third lens element 3 are both aspheric surfaces.

The fourth lens element 4 has positive refracting power. The material of the fourth lens element 4 is glass, but the disclosure is not limited thereto. An optical axis region 451 of the object-side surface 45 of the fourth lens element 4 is convex, and a periphery region 453 thereof is convex. An optical axis region 461 of the image-side surface 46 of the fourth lens element 4 is convex, and a periphery region 463 thereof is convex. In this embodiment, the object-side surface 45 and the image-side surface 46 of the fourth lens element 4 are both aspheric surfaces.

The fifth lens element 5 has negative refracting power. The material of the fifth lens element 5 is plastic, but the disclosure is not limited thereto. An optical axis region 551 of the object-side surface 55 of the fifth lens element 5 is convex, and a periphery region 554 thereof is concave. An optical axis region 562 of the image-side surface 56 of the fifth lens element 5 is concave, and a periphery region 564 thereof is concave. In this embodiment, the object-side surface 55 and the image-side surface 56 of the fifth lens element 5 are both aspheric surfaces.

The sixth lens element 6 has positive refracting power. The material of the sixth lens element 6 is plastic, but the disclosure is not limited thereto. An optical axis region 652 of the object-side surface 65 of the sixth lens element 6 is concave, and a periphery region 654 thereof is concave. An optical axis region 661 of the image-side surface 66 of the sixth lens element 6 is convex, and a periphery region 663 thereof is convex. In this embodiment, the object-side surface 65 and the image-side surface 66 of the sixth lens element 6 are both aspheric surfaces.

The seventh lens element 7 has negative refracting power. The material of the seventh lens element 7 is plastic, but the disclosure is not limited thereto. An optical axis region 751 of the object-side surface 75 of the seventh lens element 7 is convex, and a periphery region 754 thereof is concave. An optical axis region 762 of the image-side surface 76 of the seventh lens element 7 is concave, and a periphery region 763 thereof is convex. In this embodiment, the object-side surface 75 and the image-side surface 76 of the seventh lens element 7 are both aspheric surfaces.

In this embodiment, lens elements of the optical imaging lens 10 are only the first lens element 1, the second lens element 2, the third lens element 3, the fourth lens element 4, the fifth lens element 5, the sixth lens element 6, and the seventh lens element 7, which is a total of seven lens elements.

Other detailed optical data of the first embodiment is shown in FIG. 8. The effective focal length (EFL) of the optical imaging lens 10 according to the first embodiment is 2.921 millimeter (mm), the half field of view (HFOV) is 77.508 degrees, the system length (TTL) is 11.969 mm, the F-number (Fno) is 2.744, and the image height (ImgH) is 4.000 mm. The TTL refers to a distance from the object-side surface 15 of the first lens element 1 to the image plane 99 on the optical axis I.

In addition, in this embodiment, the object-side surfaces 25, 35, 45, 55, 65, and 75, and the image-side surfaces 26, 36, 46, 56, 66, and 76 of the second lens element 2, the third lens element 3, the fourth lens element 4, the fifth lens element 5, the sixth lens element 6, and the seventh lens element 7 are all aspheric surfaces. The aspheric surfaces are defined by the following equation:

$$Z(Y) = \frac{Y^2}{R}\left(1 + \sqrt{1 - (1+K)\frac{Y^2}{R^2}}\right) + \sum_{i=1}^{n} a_{2i} \times Y^{2i} \quad (1)$$

where,

R: radius of curvature of a lens surface near the optical axis I;

Y: perpendicular distance between a point on an aspheric surface and the optical axis I;

Z: depth of an aspheric surface (the perpendicular distance between a point on the aspheric surface with a distance Y from the optical axis I and the tangent to the vertex of the aspheric surface on the optical axis I);

K: conic constant; and $a_{2i}$: 2i-th order aspheric coefficient.

The various aspheric coefficients in Equation (1) from the object-side surface 25 of the second lens element 2 to the image-side surface 76 of the seventh lens element 7 are shown in FIG. 9. Wherein, the field number 25 in FIG. 9 indicates the aspheric coefficient of the object-side surface 25 of the second lens element 2, and other fields may be deduced by analogy.

In addition, relationships between important parameters in the optical imaging lens 10 according to the first embodiment are shown in FIG. 30 and FIG. 31. In FIG. 30, the unit of the parameters from the T1 column to the DT2G5 column is mm.

Where, f1 is the focal length of the first lens element 1;
f2 is the focal length of the second lens element 2;
f3 is the focal length of the third lens element 3;
f4 is the focal length of the fourth lens element 4;
f5 is the focal length of the fifth lens element 5;
f6 is the focal length of the sixth lens element 6;
f7 is the focal length of the seventh lens element 7;
n1 is the refractive index of the first lens element 1;
n2 is the refractive index of the second lens element 2;
n3 is the refractive index of the third lens element 3;
n4 is the refractive index of the fourth lens element 4;
n5 is the refractive index of the fifth lens element 5;
n6 is the refractive index of the sixth lens element 6;
n7 is the refractive index of the seventh lens element 7;
V1 is the Abbe number of the first lens element 1;
V2 is the Abbe number of the second lens element 2;
V3 is the Abbe number of the third lens element 3;
V4 is the Abbe number of the fourth lens element 4;
V5 is the Abbe number of the fifth lens element 5;
V6 is the Abbe number of the sixth lens element 6;
V7 is the Abbe number of the seventh lens element 7;
T1 is the thickness of the first lens element 1 on the optical axis I;
T2 is the thickness of the second lens element 2 on the optical axis I;
T3 is the thickness of the third lens element 3 on the optical axis I;
T4 is the thickness of the fourth lens element 4 on the optical axis I;
T5 is the thickness of the fifth lens element 5 on the optical axis I;
T6 is the thickness of the sixth lens element 6 on the optical axis I;
T7 is the thickness of the seventh lens element 7 on the optical axis I;
G12 is the air gap between the first lens element 1 and the second lens element 2 on the optical axis I, and is also the distance from the image-side surface 16 of the first lens element 1 to the object-side surface 25 of the second lens element 2 on the optical axis I;
G23 is the air gap between the second lens element 2 and the third lens element 3 on the optical axis I, and is also the distance from the image-side surface 26 of the second lens element 2 to the object-side surface 35 of the third lens element 3 on the optical axis I;
G34 is the air gap between the third lens element 3 and the fourth lens element 4 on the optical axis I, and is also the distance from the image-side surface 36 of the third lens element 3 to the object-side surface 45 of the fourth lens element 4 on the optical axis I;
G45 is the air gap between the fourth lens element 4 and the fifth lens element 5 on the optical axis I, and is also the distance from the image-side surface 46 of the fourth lens element 4 to the object-side surface 55 of the fifth lens element 5 on the optical axis I;
G56 is the air gap between the fifth lens element 5 and the sixth lens element 6 on the optical axis I, and is also the distance from the image-side surface 56 of the fifth lens element 5 to the object-side surface 65 of the sixth lens element 6 on the optical axis I;
G67 is the air gap between the sixth lens element 6 and the seventh lens element 7 on the optical axis I, and is also the distance from the image-side surface 66 of the sixth lens element 6 to the object-side surface 75 of the seventh lens element 7 on the optical axis I;
G7F is the air gap between the seventh lens element 7 and the filter 9 on the optical axis I, and is also the distance from the image-side surface 76 of the seventh lens element 7 to the object-side surface 95 of the filter 9 on the optical axis I;
TF is the thickness of the filter 9 on the optical axis I;
GFP is the air gap between the filter 9 and the image plane 99 on the optical axis I;
AAG is the sum of the six air gaps on the optical axis I from the first lens element 1 to the seventh lens element 7, that is, the sum of G12, G23, G34, G45, G56, and G67;
ALT is the sum of thicknesses of the seven lens elements on the optical axis I from the first lens element 1 to the seventh lens element 7, that is, the sum of T1, T2, T3, T4, T5, T6, and T7;
EFL is the effective focal length of the optical imaging lens 10;

BFL is the distance from the image-side surface 76 of the seventh lens element 7 to the image plane 99 on the optical axis I;

TTL is the distance from the object-side surface 15 of the first lens element 1 to the image plane 99 on the optical axis I;

TL is the distance from the object-side surface 15 of the first lens element 1 to the image-side surface 76 of the seventh lens element 7 on the optical axis I;

HFOV is the half field of view of the optical imaging lens 10;

ImgH is the image height of the optical imaging lens 10;

Fno is the F-number of the optical imaging lens 10;

SG5G6 is the sum of the air gap between the fifth lens element 5 and the sixth lens element 6 on the optical axis I and the air gap between the sixth lens element 6 and the seventh lens element 7 on the optical axis I, that is, the sum of G56 and G67;

DG5G6 is the distance from the image-side surface 56 of the fifth lens element 5 to the object-side surface 75 of the seventh lens element 7 on the optical axis I, that is, the sum of G56, T6, and G67; and DT2G5 is the distance from the object-side surface 25 of the second lens element 2 to the object-side surface 65 of the sixth lens element 6 on the optical axis I, that is, the sum of T2, G23, T3, G34, T4, G45, 15, and G56.

With reference to FIG. 7A to FIG. 7D, the diagram of FIG. 7A illustrates the longitudinal spherical aberration according to the first embodiment, the diagrams of FIG. 7B and FIG. 7C respectively illustrate the field curvature aberration in the sagittal direction and the field curvature aberration in the tangential direction on the image plane 99 when the wavelengths thereof are 436 nm, 546 nm, and 656 nm according to the first embodiment, and the diagram of FIG. 7D illustrates the distortion aberration on the image plane 99 when the wavelengths thereof are 436 nm, 546 nm, and 656 nm according to the first embodiment. In the longitudinal spherical aberration diagram according to the first embodiment in FIG. 7A, the curves formed by each wavelength are all very close to and approaching the middle, which illustrates that off-axis rays with different heights of each wavelength are concentrated near an imaging point. It can be seen from the skewness amplitude of the curve of each wavelength that the deviation of the imaging point of off-axis rays with different heights is controlled within the range of ±0.08 mm. Therefore, the first embodiment does significantly improve the spherical aberration of the same wavelength. In addition, the distances between the three types of representative wavelengths are also fairly close to each other, which means that imaging positions of rays with different wavelengths are fairly concentrated, so that the chromatic aberration is also significantly improved.

In the two field curvature aberration diagrams of FIG. 7B and FIG. 7C, the field curvature aberrations of the three representative wavelengths within the entire field of view fall within ±0.14 mm, which indicates that the optical system of the first embodiment can effectively eliminate aberrations. The distortion aberration diagram of FIG. 7D shows that the distortion aberration of the first embodiment is maintained within the range of ±70%, which indicates that the distortion aberration of the first embodiment can meet the imaging quality requirements of the optical system. Accordingly, compared with the existing optical imaging lens, the optical imaging lens of the first embodiment can still provide good imaging quality under the conditions of having a large field of view with the HFOV of 77.508 degrees and the system length being shortened to about 11.969 mm.

Figure 10:
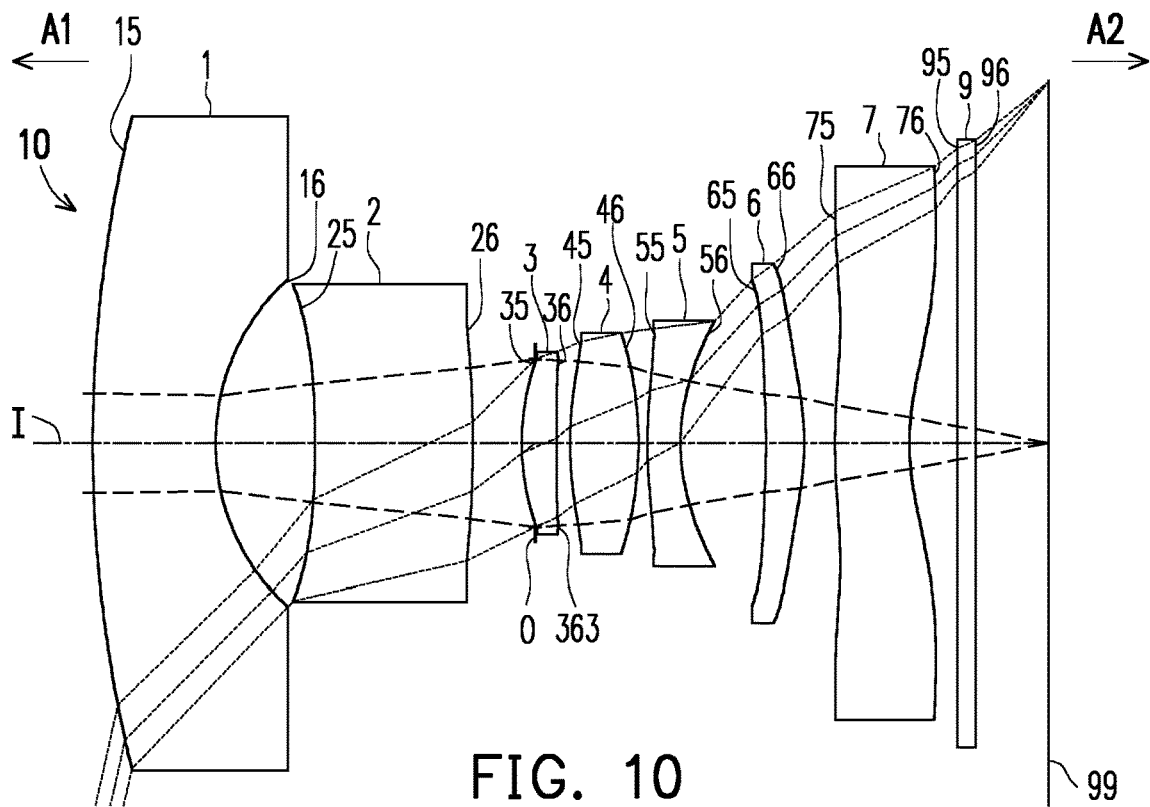
FIG. 10 is a schematic diagram of an optical imaging lens according to a second embodiment of the disclosure.

FIG. 10 is a schematic diagram of an optical imaging lens according to a second embodiment of the disclosure. FIG. 11A to FIG. 11D are diagrams of longitudinal spherical aberration and various aberrations of the optical imaging lens according to the second embodiment. Referring to FIG. 10 first, a second embodiment of the optical imaging lens 10 of the disclosure is roughly similar to the first embodiment, and the differences between the two are as follows: various optical data, aspheric coefficients, and parameters between the lens elements 1, 2, 3, 4, 5, 6, and 7 are more or less different. In addition, in this embodiment, the second lens element 2 has negative refracting power, and a periphery region 363 of the image-side surface 36 of the third lens element 3 is convex. It should be noted here that in order to clearly show the drawing, the reference numerals of the optical axis region(s) and the periphery region(s) similar to the first embodiment are omitted in FIG. 10.

Detailed optical data of the optical imaging lens 10 according to the second embodiment is shown in FIG. 12. The effective focal length (EFL) of the optical imaging lens 10 according to the second embodiment is 2.864 mm, the half field of view (HFOV) is 77.506 degrees, the system length (TTL) is 10.595 mm, the F-number (Fno) is 2.529, and the image height (ImgH) is 4.000 mm.

FIG. 13 shows the various aspheric coefficients in Equation (1) from the object-side surface 25 of the second lens element 2 to the image-side surface 76 of the seventh lens element 7 according to the second embodiment.

In addition, relationships between important parameters in the optical imaging lens 10 according to the second embodiment are shown in FIG. 30 and FIG. 31.

Figures 11A, 11B, 11C, 11D:
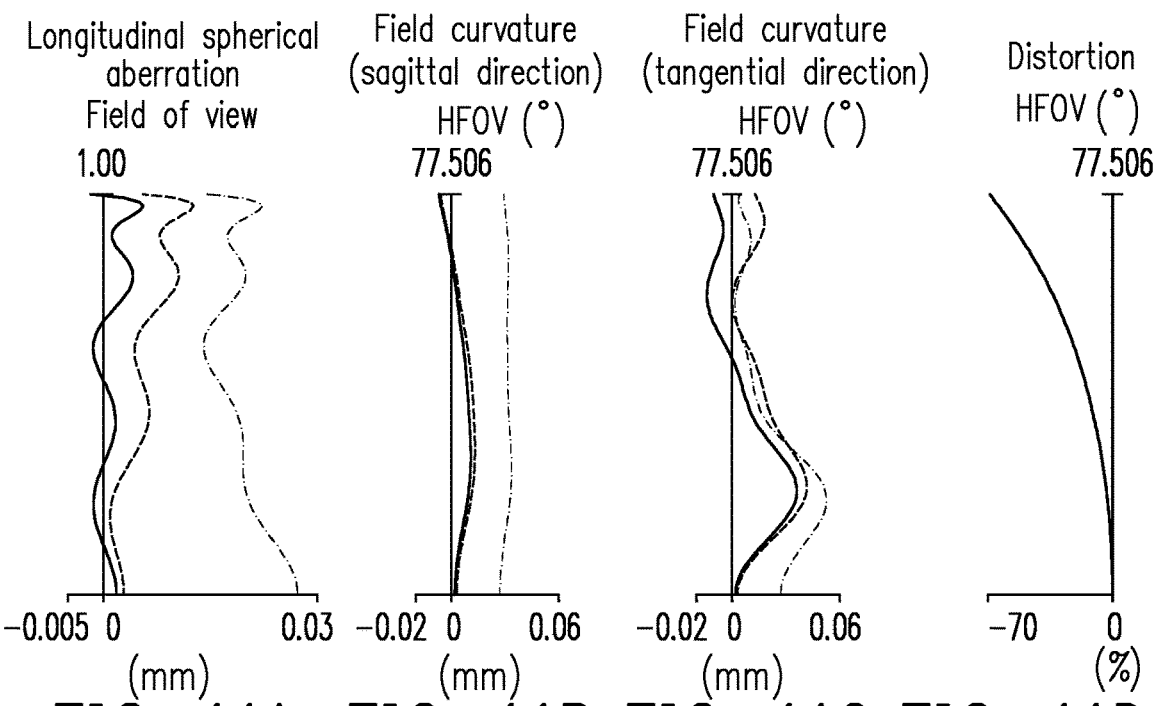
FIG. 11A to FIG. 11D are diagrams of longitudinal spherical aberration and various aberrations of the optical imaging lens according to the second embodiment.

In the longitudinal spherical aberration diagram according to the second embodiment in FIG. 11A, the deviation of an imaging point of off-axis rays with different heights is controlled within the range of ±0.03 mm. In the two field curvature aberration diagrams of FIG. 11B and FIG. 11C, the field curvature aberrations of the three representative wavelengths within the entire field of view fall within ±0.06 mm. The distortion aberration diagram of FIG. 11D shows that the distortion aberration of the second embodiment is maintained within the range of ±70%. Accordingly, compared with the existing optical imaging lens, the second embodiment can still provide good imaging quality under the conditions of having a large field of view with the HFOV of 77.506 degrees and the system length being shortened to about 10.595 mm.

It can be known from the above description that the advantages of the second embodiment compared to the first embodiment are: the system length (TTL) of the second embodiment is shorter than that of the first embodiment, the F-number (Fno) of the second embodiment is smaller than that of the first embodiment (the aperture is larger), the longitudinal spherical aberration and the field curvature aberration of the second embodiment is better than those of the first embodiment, and the thickness difference between the optical axis and the periphery regions of the lens elements of the second embodiment is smaller than that of the first embodiment, which is easy to manufacture, so as to have a higher yield.

FIG. 14 is a schematic diagram of an optical imaging lens according to a third embodiment of the disclosure. FIG. 15A to FIG. 15D are diagrams of longitudinal spherical aberration and various aberrations of the optical imaging lens according to the third embodiment. Referring to FIG. 14 first, a third embodiment of the optical imaging lens 10 of the disclosure is roughly similar to the first embodiment, and the differences between the two are as follows: various optical data, aspheric coefficients, and parameters between the lens elements 1, 2, 3, 4, 5, 6, and 7 are more or less different. In addition, in this embodiment, a periphery region 363 of the image-side surface 36 of the third lens element 3 is convex, and a periphery region 454 of the object-side surface 45 of the fourth lens element 4 is concave. It should be noted here that in order to clearly show the drawing, the reference numerals of the optical axis region(s) and the periphery region(s) similar to the first embodiment are omitted in FIG. 14.

Detailed optical data of the optical imaging lens 10 according to the third embodiment is shown in FIG. 16. The effective focal length (EFL) of the optical imaging lens 10 according to the third embodiment is 2.766 mm, the half field of view (HFOV) is 77.505 degrees, the system length (TTL) is 10.087 mm, the F-number (Fno) is 2.529, and the image height (ImgH) is 4.000 mm.

FIG. 17 shows the various aspheric coefficients in Equation (1) from the object-side surface 25 of the second lens element 2 to the image-side surface 76 of the seventh lens element 7 according to the third embodiment.

In addition, relationships between important parameters in the optical imaging lens 10 according to the third embodiment are shown in FIG. 30 and FIG. 31.

In the longitudinal spherical aberration diagram according to the third embodiment in FIG. 15A, the deviation of an imaging point of off-axis rays with different heights is controlled within the range of ±0.025 mm. In the two field curvature aberration diagrams of FIG. 15B and FIG. 15C, the field curvature aberrations of the three representative wavelengths within the entire field of view fall within ±0.10 mm. The distortion aberration diagram of FIG. 15D shows that the distortion aberration of the third embodiment is maintained within the range of ±70%. Accordingly, compared with the existing optical imaging lens, the third embodiment can still provide good imaging quality under the conditions of having a large field of view with the HFOV of 77.505 degrees and the system length being shortened to about 10.087 mm.

It can be known from the above description that the advantages of the third embodiment compared to the first embodiment are: the system length (TTL) of the third embodiment is shorter than that of the first embodiment, the F-number (Fno) of the third embodiment is smaller than that of the first embodiment (the aperture is larger), the longitudinal spherical aberration and the field curvature aberration of the third embodiment is better than those of the first embodiment, and the thickness difference between the optical axis and the periphery regions of the lens elements of the third embodiment is smaller than that of the first embodiment, which is easy to manufacture, so as to have a higher yield.

Figure 18:
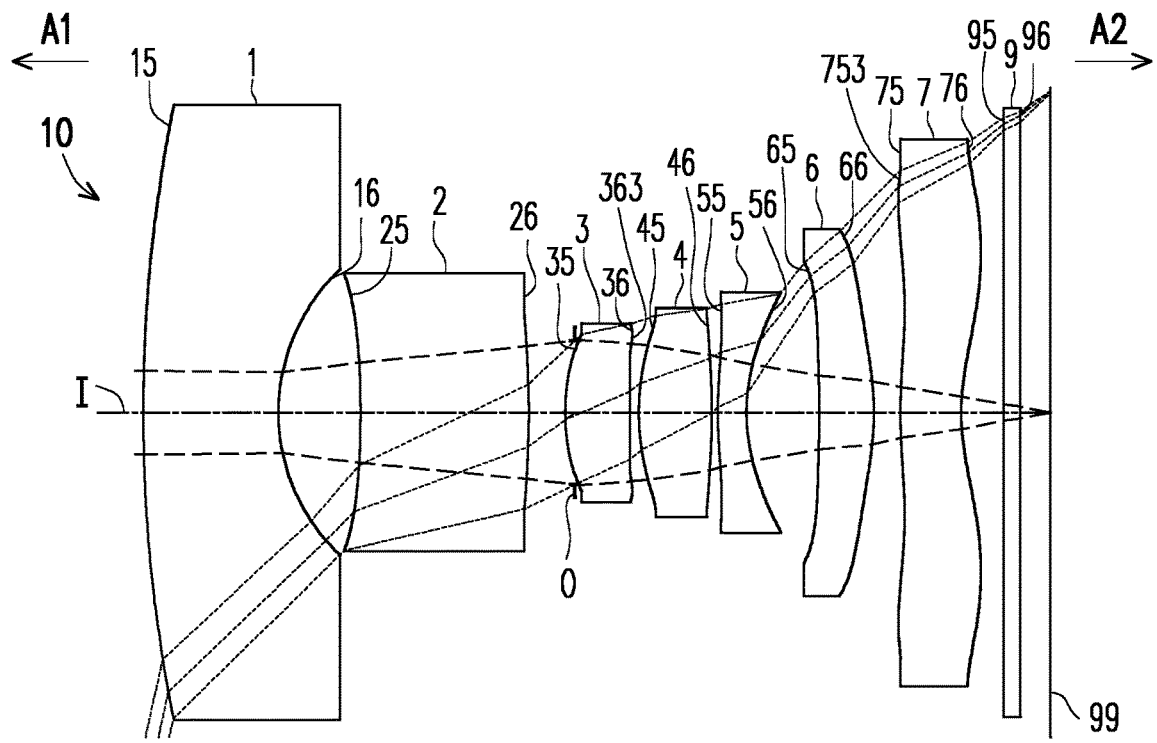
FIG. 18 is a schematic diagram of an optical imaging lens according to a fourth embodiment of the disclosure.

FIG. 18 is a schematic diagram of an optical imaging lens according to a fourth embodiment of the disclosure. FIG. 19A to FIG. 19D are diagrams of longitudinal spherical aberration and various aberrations of the optical imaging lens according to the fourth embodiment. Referring to FIG. 18 first, a fourth embodiment of the optical imaging lens 10 of the disclosure is roughly similar to the first embodiment, and the differences between the two are as follows: various optical data, aspheric coefficients, and parameters between the lens elements 1, 2, 3, 4, 5, 6, and 7 are more or less different. In addition, in this embodiment, a periphery region 363 of the image-side surface 36 of the third lens element 3 is convex, and a periphery region 753 of the object-side surface 75 of the seventh lens element 7 is convex. It should be noted here that in order to clearly show the drawing, the reference numerals of the optical axis region(s) and the periphery region(s) similar to the first embodiment are omitted in FIG. 18.

Detailed optical data of the optical imaging lens 10 according to the fourth embodiment is shown in FIG. 20. The effective focal length (EFL) of the optical imaging lens 10 according to the fourth embodiment is 2.704 mm, the half field of view (HFOV) is 77.495 degrees, the system length (TTL) is 11.284 mm, the F-number (Fno) is 2.529, and the image height (ImgH) is 4.000 mm.

FIG. 21 shows the various aspheric coefficients in Equation (1) from the object-side surface 25 of the second lens element 2 to the image-side surface 76 of the seventh lens element 7 according to the fourth embodiment.

In addition, relationships between important parameters in the optical imaging lens 10 according to the fourth embodiment are shown in FIG. 30 and FIG. 31.

Figures 19A, 19B, 19C, 19D:
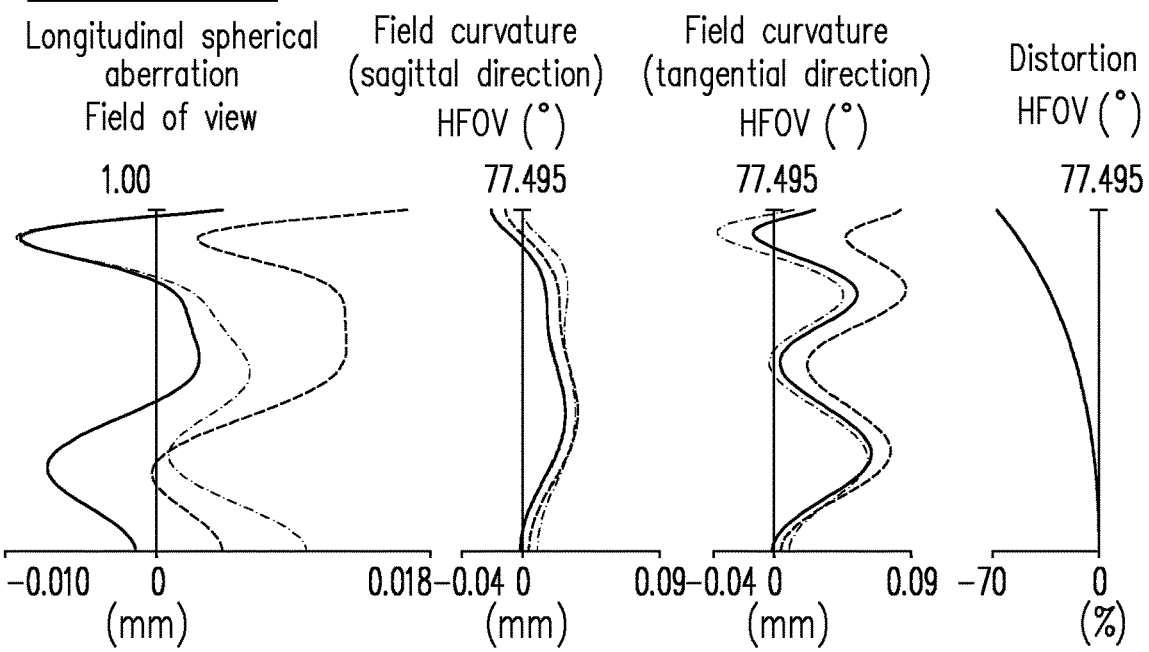
FIG. 19A to FIG. 19D are diagrams of longitudinal spherical aberration and various aberrations of the optical imaging lens according to the fourth embodiment.

In the longitudinal spherical aberration diagram according to the fourth embodiment in FIG. 19A, the deviation of an imaging point of off-axis rays with different heights is controlled within the range of ±0.018 mm. In the two field curvature aberration diagrams of FIG. 19B and FIG. 19C, the field curvature aberrations of the three representative wavelengths within the entire field of view fall within ±0.09 mm. The distortion aberration diagram of FIG. 19D shows that the distortion aberration of the fourth embodiment is maintained within the range of ±70%. Accordingly, compared with the existing optical imaging lens, the fourth embodiment can still provide good imaging quality under the conditions of having a large field of view with the HFOV of 77.495 degrees and the system length being shortened to about 11.284 mm.

It can be known from the above description that the advantages of the fourth embodiment compared to the first embodiment are: the system length (TTL) of the fourth embodiment is shorter than that of the first embodiment, the F-number (Fno) of the fourth embodiment is smaller than that of the first embodiment (the aperture is larger), the longitudinal spherical aberration and the field curvature aberration of the fourth embodiment are better than those of the first embodiment, and the thickness difference between the optical axis and the periphery regions of the lens elements of the fourth embodiment is smaller than that of the first embodiment, which is easy to manufacture, so as to have a higher yield.

Figure 22:
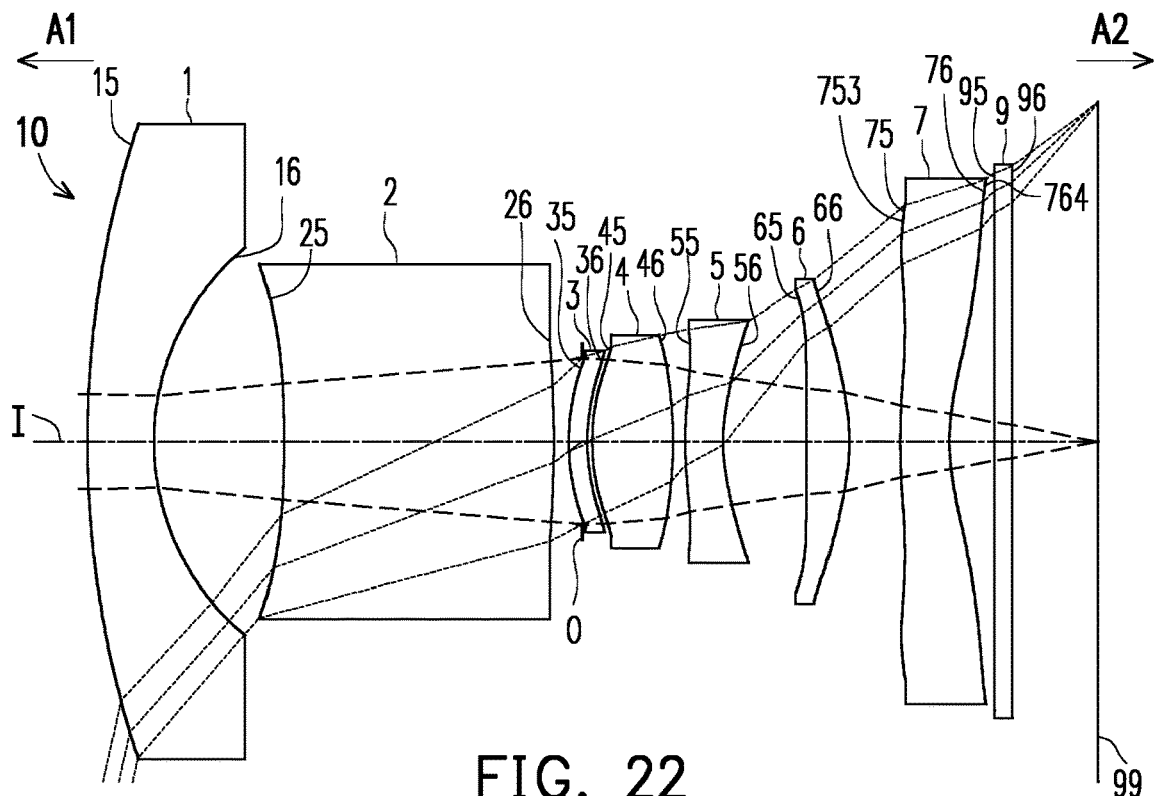
FIG. 22 is a schematic diagram of an optical imaging lens according to a fifth embodiment of the disclosure.

FIG. 22 is a schematic diagram of an optical imaging lens according to a fifth embodiment of the disclosure. FIG. 23A to FIG. 23D are diagrams of longitudinal spherical aberration and various aberrations of the optical imaging lens according to the fifth embodiment. Referring to FIG. 22 first, a fifth embodiment of the optical imaging lens 10 of the disclosure is roughly similar to the first embodiment, and the differences between the two are as follows: various optical data, aspheric coefficients, and parameters between the lens elements 1, 2, 3, 4, 5, 6, and 7 are more or less different. In addition, in this embodiment, the second lens element 2 has negative refracting power, the third lens element 3 has negative refracting power, a periphery region 753 of the object-side surface 75 of the seventh lens element 7 is convex, and a periphery region 764 of the image-side surface 76 of the seventh lens element 7 is concave. It should be noted here that in order to clearly show the drawing, the reference numerals of the optical axis region(s) and the periphery region(s) similar to the first embodiment are omitted in FIG. 22.

Detailed optical data of the optical imaging lens 10 according to the fifth embodiment is shown in FIG. 24. The effective focal length (EFL) of the optical imaging lens 10 according to the fifth embodiment is 2.900 mm, the half field of view (HFOV) is 77.507 degrees, the system length (TTL) is 11.893 mm, the F-number (Fno) is 2.529, and the image height (ImgH) is 4.000 mm.

FIG. 25 shows the various aspheric coefficients in Equation (1) from the object-side surface 25 of the second lens element 2 to the image-side surface 76 of the seventh lens element 7 according to the fifth embodiment.

In addition, relationships between important parameters in the optical imaging lens 10 according to the fifth embodiment are shown in FIG. 30 and FIG. 31.

Figures 23A, 23B, 23C, 23D:
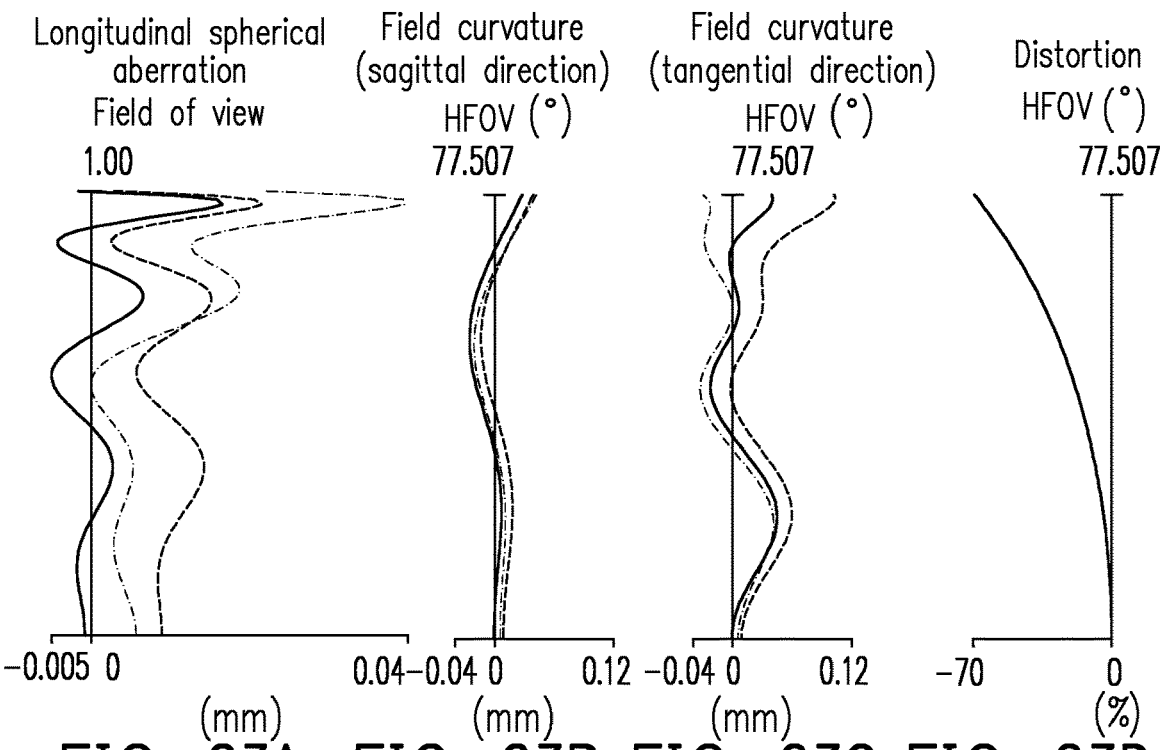
FIG. 23A to FIG. 23D are diagrams of longitudinal spherical aberration and various aberrations of the optical imaging lens according to the fifth embodiment.

In the longitudinal spherical aberration diagram according to the fifth embodiment in FIG. 23A, the deviation of an imaging point of off-axis rays with different heights is controlled within the range of ±0.04 mm. In the two field curvature aberration diagrams of FIG. 23B and FIG. 23C, the field curvature aberrations of the three representative wavelengths within the entire field of view fall within ±0.12 mm. The distortion aberration diagram of FIG. 23D shows that the distortion aberration of the fifth embodiment is maintained within the range of ±70%. Accordingly, compared with the existing optical imaging lens, the fifth embodiment can still provide good imaging quality under the conditions of having a large field of view with the HFOV of 77.507 degrees and the system length being shortened to about 11.893 mm.

It can be known from the above description that the advantages of the fifth embodiment compared to the first embodiment are: the system length (TTL) of the fifth embodiment is shorter than that of the first embodiment, the F-number (Fno) of the fifth embodiment is smaller than that of the first embodiment (the aperture is larger), the longitudinal spherical aberration and the field curvature aberration of the fifth embodiment are better than those of the first embodiment, and the thickness difference between the optical axis and the periphery regions of the lens elements of the fifth embodiment is smaller than that of the first embodiment, which is easy to manufacture, so as to have a higher yield.

FIG. 26 is a schematic diagram of an optical imaging lens according to a sixth embodiment of the disclosure. FIG. 27A to FIG. 27D are diagrams of longitudinal spherical aberration and various aberrations of the optical imaging lens according to the sixth embodiment. Referring to FIG. 26, a sixth embodiment of the optical imaging lens 10 of the disclosure is roughly similar to the first embodiment, and the differences between the two are as follows: various optical data, aspheric coefficients, and parameters between the lens elements 1, 2, 3, 4, 5, 6, and 7 are more or less different. In addition, in this embodiment, the fifth lens element 5 has positive refracting power, a periphery region 264 of the image-side surface 26 of the second lens element 2 is concave, a periphery region 363 of the image-side surface 36 of the third lens element 3 is convex, and a periphery region 463 of the image-side surface 46 of the fourth lens element 4 is concave. It should be noted here that in order to clearly show the drawing, the reference numerals of the optical axis region(s) and the periphery region(s) similar to the first embodiment are omitted in FIG. 26.

Detailed optical data of the optical imaging lens 10 according to the sixth embodiment is shown in FIG. 28. The effective focal length (EFL) of the optical imaging lens 10 according to the sixth embodiment is 2.583 mm, the half field of view (HFOV) is 77.511 degrees, the system length (TTL) is 11.030 mm, the F-number (Fno) is 2.529, and the image height (ImgH) is 4.000 mm.

FIG. 29 shows the various aspheric coefficients in the Equation (1) from the object-side surface 25 of the second lens element 2 to the image-side surface 76 of the seventh lens element 7 according to the sixth embodiment.

In addition, relationships between important parameters in the optical imaging lens 10 according to the sixth embodiment are shown in FIG. 30 and FIG. 31.

In the longitudinal spherical aberration diagram according to the sixth embodiment in FIG. 27A, the deviation of an imaging point of off-axis rays with different heights is controlled within the range of ±0.09 mm. In the two field curvature aberration diagrams in FIG. 27B and FIG. 27C, the field curvature aberrations of the three representative wavelengths within the entire field of view fall within ±0.14 mm. The distortion aberration diagram of FIG. 27D shows that the distortion aberration according to the sixth embodiment is maintained within the range of ±70%. Accordingly, compared with the existing optical imaging lens, the sixth embodiment can still provide good imaging quality under the conditions of having a large field of view with the HFOV of 77.511 degrees and the system length being shortened to about 11.030 mm.

It can be known from the above description that the advantages of the sixth embodiment compared to the first embodiment are: the system length (TTL) of the sixth embodiment is shorter than that of the first embodiment, the half field of view (HFOV) of the sixth embodiment is larger than that of the first embodiment, the F-number (Fno) of the sixth embodiment is smaller than that of the first embodiment (the aperture is larger), and the thickness difference between the optical axis and the periphery regions of the lens elements of the sixth embodiment is smaller than that of the first embodiment, which is easy to manufacture, so as to have a higher yield.

With further reference to FIG. 30 and FIG. 31, which are tabular diagrams of the various optical parameters of the first embodiment to the sixth embodiment.

Through the numerical control of optical properties and parameters of the following lens elements, the designer may be assisted to design an optical imaging lens having a large field of view, good optical performance, short lens length, and technical feasibility.

In the embodiments of the disclosure, the objectives of correcting aberrations and reducing distortions of the optical system may be effectively achieved through the design of the surface, for example: the periphery region of the object-side surface of the second lens element is concave, the optical axis region of the image-side surface of the second lens element is convex, and together with one of the following combinations:

(a) The optical axis region of the image-side surface of the first lens element is concave, the seventh lens element has negative refracting power, and the optical axis region of the image-side surface of the seventh lens element is concave;

(b) The optical axis region of the object-side surface of the first lens element is convex, the fourth lens element has positive refracting power, the sixth lens element has positive refracting power, and the periphery region of the object-side surface of the sixth lens element is concave; and (c) The optical axis region of the object-side surface of the first lens element is convex, the periphery region of the image-side surface of the fifth lens element is concave, and the periphery region of the image-side surface of the sixth lens element is convex.

Moreover, when (a) combination is satisfied together with: SG5G6/(G45+T5)≥2.600; or when (b) combination is satisfied together with: the first lens element having negative refracting power and DG5G6/(T4+G45)≥1.900; or when (c) combination is satisfied together with: the seventh lens element having negative refracting power and DT2G5/(T6+T7)≥4.000, the field of view of the optical imaging lens may also effectively expanded. In the above conditions, the preferable range of SG5G6/(G45+T5) is 2.600≤SG5G6/(G45+T5)≤5.300; the preferable range of DG5G6/(T4+G45) is 1.900≤DG5G6/(T4+G45)≤3.500; and the preferable range of DT2G5/(T6+T7) is 4.000≤DT2G5/(T6+T7)≤7.200.

In the embodiments of the disclosure, through the configuration of the material of the lens elements to satisfy the condition of V2+V3+V4≤120.000 or the condition of V5+V6+V7≤110.000, the chromatic aberration may be effectively improved. In the above conditions, the preferable range of V2+V3+V4 is 120.000≤V2+V3+V4≤165.000; and the preferable range of V5+V6+V7 is 90.000≤V5+V6+V7≤110.000. However, if the embodiments of the disclosure conform to the first lens element or the fourth lens element being made of glass, the optical imaging lens can maintain extremely high thermal stability under the use environment of −10.000° C. to 60.000° C., that is, maintain a smaller amount of focal length offset.

On the other hand, in order to shorten the system length of the optical imaging lens, the air gap between the lens elements or the thickness of the lens elements may be appropriately adjusted, but at the same time, the level of difficulty of production and the need to ensure imaging quality must be considered. Therefore, if the numerical limits of the following conditional expressions are satisfied, the optical imaging lens can have better configuration:

(G12+T2)/(T4+T5+T6)≥1.500, preferably 1.500≤(G12+T2)/(T4+T5+T6)≤4.700;

ALT/BFL≥3.800, preferably 3.800≤ALT/BFL≤6.700;

(G56+G67)/T5≥3.500, preferably 3.500≤(G56+G67)/T5≤7.800;

(T1+G56)/T7≥2.800, preferably 2.800≤(T1+G56)/T7≤6.000;

AAG/(T1+T4)≤2.800, preferably 1.000≤AAG/(T1+T4)≤2.800;

T2/(T1+G45)≥1.200, preferably 1.200≤T2/(T1+G45)≤3.500;

TTL/(T1+G12+T2)≤3.000, preferably 1.500≤TTL/(T1+G12+T2)≤3.000;

(EFL+T5)/G56≤3.500, preferably 1.800≤(EFL+T5)/G56≤3.500;

TL/(T2+T3)≤5.000, preferably 2.800≤TL/(T2+T3)≤5.000;

TL/(G12+T2+G56)≤3.000, preferably 1.500≤TL/(G12+T2+G56)≤3.000;

(T6+G67+T7)/T1≤2.200, preferably 0.500≤(T6+G67+T7)/T1≤2.200;

EFL/(G12+G67)≤2.000, preferably 0.700≤EFL/(G12+G67)≤2.000;

T1/(G23+G34)≥1.500, preferably 1.500≤T1/(G23+G34)≤6.500;

(T2+T3)/T5≥5.800, preferably 5.800≤(T2+T3)/T5≤14.000; and

EFL/T7≤5.000, preferably 3.200≤EFL/T7≤5.000.

In addition, any combination of the parameters of the embodiments may be selected to increase the limitation of the lens, so as to facilitate the design of the lens with the same architecture as the disclosure.

In view of the unpredictability of the design of the optical system, under the architecture of the disclosure, satisfying the above conditions can better expand the field of view, shorten the lens length, improve the imaging quality, or increase the assembly yield to improve the shortcomings of the prior art.

When implementing the disclosure, in addition to the above conditional expressions, other detailed structures such as the arrangement of concave-convex surfaces of more lens elements may also be designed for a single lens element or more extensively for multiple lens elements to enhance the control of the system performance and/or resolution. It should be noted that such details need to be selectively combined and applied to other embodiments of the disclosure without conflict.

The contents in the embodiments of the invention include but are not limited to a focal length, a thickness of a lens element, an Abbe number, or other optical parameters. For example, in the embodiments of the invention, an optical parameter A and an optical parameter B are disclosed, wherein the ranges of the optical parameters, comparative relation between the optical parameters, and the range of a conditional expression covered by a plurality of embodiments are specifically explained as follows:

(1) The ranges of the optical parameters are, for example, $\alpha_2 \leq A \leq \alpha_1$ or $\beta_2 \leq B \leq \beta_1$, where $\alpha_1$ is a maximum value of the optical parameter A among the plurality of embodiments, $\alpha_2$ is a minimum value of the optical parameter A among the plurality of embodiments, $\beta_1$ is a maximum value of the optical parameter B among the plurality of embodiments, and $\beta_2$ is a minimum value of the optical parameter B among the plurality of embodiments.

(2) The comparative relation between the optical parameters is that A is greater than B or A is less than B, for example.

(3) The range of a conditional expression covered by a plurality of embodiments is in detail a combination relation or proportional relation obtained by a possible operation of a plurality of optical parameters in each same embodiment. The relation is defined as E, and E is, for example, A+B or A−B or A/B or A*B or $(A*B)^{1/2}$, and E satisfies a conditional expression $E \leq \gamma_1$ or $E \leq \gamma_2$ or $\gamma_2 \leq E \leq \gamma_1$, where each of $\gamma_1$ and $\gamma_2$ is a value obtained by an operation of the optical parameter A and the optical parameter B in a same embodiment, $\gamma_1$ is a maximum value among the plurality of the embodiments, and $\gamma_2$ is a minimum value among the plurality of the embodiments.

The ranges of the aforementioned optical parameters, the aforementioned comparative relations between the optical parameters, and a maximum value, a minimum value, and the numerical range between the maximum value and the minimum value of the aforementioned conditional expressions are all implementable and all belong to the scope disclosed by the invention. The aforementioned description is for exemplary explanation, but the invention is not limited thereto.

The embodiments of the invention are all implementable. In addition, a combination of partial features in a same embodiment can be selected, and the combination of partial features can achieve the unexpected result of the invention with respect to the prior art. The combination of partial features includes but is not limited to the surface shape of a lens element, a refracting power, a conditional expression or the like, or a combination thereof. The description of the embodiments is for explaining the specific embodiments of the principles of the invention, but the invention is not limited thereto. Specifically, the embodiments and the drawings are for exemplifying, but the invention is not limited thereto.

What is claimed is:

1. An optical imaging lens, comprising a first lens element, a second lens element, a third lens element, a fourth lens element, a fifth lens element, a sixth lens element, and a seventh lens element arranged in sequence from an object side to an image side along an optical axis, wherein each of the first lens element to the seventh lens element comprises an object-side surface facing the object side and allowing imaging rays to pass through, and an image-side surface facing the image side and allowing imaging rays to pass through, wherein an optical axis region of the image-side surface of the first lens element is concave;
a periphery region of the object-side surface of the second lens element is concave and an optical axis region of the image-side surface of the second lens element is convex;
the seventh lens element has negative refracting power and an optical axis region of the image-side surface of the seventh lens element is concave; and
lens elements of the optical imaging lens are only the seven lens elements, and the optical imaging lens satisfies a following conditional expression:

$SG5G6/(G45+T5) \leq 2.600$;

where SG5G6 is a sum of an air gap between the fifth lens element and the sixth lens element on the optical axis and an air gap between the sixth lens element and the seventh lens element on the optical axis, G45 is an air gap between the fourth lens element and the fifth lens element on the optical axis, and T5 is a thickness of the fifth lens element on the optical axis.

2. The optical imaging lens according to claim 1, wherein the optical imaging lens further satisfies: $T2/(T1+G45) \geq 1.200$, where T2 is a thickness of the second lens element on the optical axis, and T1 is a thickness of the first lens element on the optical axis.

3. The optical imaging lens according to claim 1, wherein the optical imaging lens further satisfies $(T1+G56)/T7 \geq 2.800$, where T1 is a thickness of the first lens element on the optical axis, G56 is an air gap between the fifth lens element and the sixth lens element on the optical axis, and T7 is a thickness of the seventh lens element on the optical axis.

4. The optical imaging lens according to claim 1, wherein the optical imaging lens further satisfies: $(T6+G67+T7)/T1 \leq 2.200$, where T6 is a thickness of the sixth lens element on the optical axis, G67 is an air gap between the sixth lens element and the seventh lens element on the optical axis, T7 is a thickness of the seventh lens element on the optical axis, and T1 is a thickness of the first lens element on the optical axis.

5. The optical imaging lens according to claim 1, wherein the optical imaging lens further satisfies: $EFL/T7 \leq 5.000$, where EFL is an effective focal length of the optical imaging lens, and T7 is a thickness of the seventh lens element on the optical axis.

6. The optical imaging lens according to claim 1, wherein the optical imaging lens further satisfies: $AAG/(T1+T4) \leq 2.800$, where AAG is a sum of six air gaps from the first lens element to the seventh lens element on the optical axis, T1 is a thickness of the first lens element on the optical axis, and T4 is a thickness of the fourth lens element on the optical axis.

7. An optical imaging lens, comprising a first lens element, a second lens element, a third lens element, a fourth lens element, a fifth lens element, a sixth lens element, and a seventh lens element arranged in sequence from an object side to an image side along an optical axis, wherein each of the first lens element to the seventh lens element comprises an object-side surface facing the object side and allowing imaging rays to pass through, and an image-side surface facing the image side and allowing imaging rays to pass through, wherein the first lens element has negative refracting power and an optical axis region of the object-side surface of the first lens element is convex;
a periphery region of the object-side surface of the second lens element is concave and an optical axis region of the image-side surface of the second lens element is convex;
the fourth lens element has positive refracting power;
the sixth lens element has positive refracting power and a periphery region of the object-side surface of the sixth lens element is concave; and
lens elements of the optical imaging lens are only the seven lens elements, and the optical imaging lens satisfies a following conditional expression:

$DG5G6/(T4+G45) \geq 1.900$; and $(T1+G56)/T7 \geq 2.800$, where DG5G6 is a distance from the image-side surface of the fifth lens element to the object-side surface of the seventh lens element on the optical axis, T4 is a thickness of the fourth lens element on the optical axis, G45 is an air gap between the fourth lens element and the fifth lens element on the optical axis, T1 is a thickness of the first lens element on the optical axis, G56 is an air gap between the fifth lens element and the sixth lens element on the optical axis, and T7 is a thickness of the seventh lens element on the optical axis.

8. The optical imaging lens according to claim 7, wherein the optical imaging lens further satisfies: $(G56+G67)/T5 \geq 3.500$, G67 is an air gap between the sixth lens element and the seventh lens element on the optical axis, and T5 is a thickness of the fifth lens element on the optical axis.

9. The optical imaging lens according to claim 7, wherein the optical imaging lens further satisfies: $(EFL+T5)/G56 \leq 3.500$, where EFL is an effective focal length of the optical imaging lens, and T5 is a thickness of the fifth lens element on the optical axis.

10. The optical imaging lens according to claim 7, wherein the optical imaging lens further satisfies: $(T2+T3)/T5 \geq 5.800$, where T2 is a thickness of the second lens element on the optical axis, T3 is a thickness of the third lens element on the optical axis, and T5 is a thickness of the fifth lens element on the optical axis.

11. The optical imaging lens according to claim 7, wherein the optical imaging lens further satisfies: ALT/BFL≥3.800, where ALT is a sum of thicknesses of the seven lens elements from the first lens element to the seventh lens element on the optical axis, and BFL is a distance from the image-side surface of the seventh lens element to an image plane on the optical axis.

12. The optical imaging lens according to claim 7, wherein the optical imaging lens further satisfies: TTL/(T1+G12+T2)≤3.000, where TTL is a distance from the object-side surface of the first lens element to an image plane on the optical axis, G12 is an air gap between the first lens element and the second lens element on the optical axis, and T2 is a thickness of the second lens element on the optical axis.

13. The optical imaging lens according to claim 7, wherein the optical imaging lens further satisfies: TL/(T2+T3)≤5.000, where TL is a distance from the object-side surface of the first lens element to the image-side surface of the seventh lens element on the optical axis, T2 is a thickness of the second lens element on the optical axis, and T3 is a thickness of the third lens element on the optical axis.

14. An optical imaging lens, comprising a first lens element, a second lens element, a third lens element, a fourth lens element, a fifth lens element, a sixth lens element, and a seventh lens element arranged in sequence from an object side to an image side along an optical axis, wherein each of the first lens element to the seventh lens element comprises an object-side surface facing the object side and allowing imaging rays to pass through, and an image-side surface facing the image side and allowing imaging rays to pass through, wherein an optical axis region of the object-side surface of the first lens element is convex;
a periphery region of the object-side surface of the second lens element is concave and an optical axis region of the image-side surface of the second lens element is convex;
a periphery region of the image-side surface of the fifth lens element is concave;
a periphery region of the image-side surface of the sixth lens element is convex;
the seventh lens element has negative refracting power; and
lens elements of the optical imaging lens are only the seven lens elements, and the optical imaging lens satisfies a following conditional expression:

$DT2G5/(T6+T7) \geq 4.000$;

where DT2G5 is a distance from the object-side surface of the second lens element to the object-side surface of the sixth lens element on the optical axis, T6 is a thickness of the sixth lens element on the optical axis, and T7 is a thickness of the seventh lens element on the optical axis.

15. The optical imaging lens according to claim 14, wherein the optical imaging lens further satisfies: (G12+T2)/(T4+T5+T6)≥1.500, where G12 is an air gap between the first lens element and the second lens element on the optical axis, T2 is a thickness of the second lens element on the optical axis, T4 is a thickness of the fourth lens element on the optical axis, and T5 is a thickness of the fifth lens element on the optical axis.

16. The optical imaging lens according to claim 14, wherein the optical imaging lens further satisfies: V2+V3+V4≥120.000, where V2 is an Abbe number of the second lens element, V3 is an Abbe number of the third lens element, and V4 is an Abbe number of the fourth lens element.

17. The optical imaging lens according to claim 14, wherein the optical imaging lens further satisfies: V5+V6+V7≥110.000, where V5 is an Abbe number of the fifth lens element, V6 is an Abbe number of the sixth lens element, and V7 is an Abbe number of the seventh lens element.

18. The optical imaging lens according to claim 14, wherein the optical imaging lens further satisfies: TL/(G12+T2+G56)≤3.000, where TL is a distance from the object-side surface of the first lens element to the image-side surface of the seventh lens element on the optical axis, G12 is an air gap between the first lens element and the second lens element on the optical axis, T2 is a thickness of the second lens element on the optical axis, and G56 is an air gap between the fifth lens element and the sixth lens element on the optical axis.

19. The optical imaging lens according to claim 14, wherein the optical imaging lens further satisfies: EFL/(G12+G67)≤2.000, where EFL is an effective focal length of the optical imaging lens, G12 is an air gap between the first lens element and the second lens element on the optical axis, and G67 is an air gap between the sixth lens element and the seventh lens element on the optical axis.

20. The optical imaging lens according to claim 14, wherein the optical imaging lens further satisfies: T1/(G23+G34)≥1.500, where T1 is a thickness of the first lens element on the optical axis, G23 is an air gap between the second lens element and the third lens element on the optical axis, and G34 is an air gap between the third lens element and the fourth lens element on the optical axis.

* * * * *